United States Patent [19]

Kostoff et al.

[11] Patent Number: 5,440,481

[45] Date of Patent: Aug. 8, 1995

[54] SYSTEM AND METHOD FOR DATABASE TOMOGRAPHY

[75] Inventors: Ronald N. Kostoff, Falls Church, Va.; David L. Miles; Henry J. Eberhart, both of Ridgecrest, Calif.

[73] Assignee: The United States of America as represented by the Secretary of the Navy, Washington, D.C.

[21] Appl. No.: 967,341

[22] Filed: Oct. 28, 1992

[51] Int. Cl.6 .................. G06F 17/20; G06F 17/30
[52] U.S. Cl. .................. 364/419.08; 364/419.07; 364/419.19
[58] Field of Search ............ 364/419.08, 419.07, 364/419.13, 419.19; 395/600

[56] References Cited

U.S. PATENT DOCUMENTS

| | | | |
|---|---|---|---|
| 4,839,853 | 6/1989 | Deerwester et al. | 364/DIG. 2 |
| 4,849,898 | 7/1989 | Adi | 364/419.08 |
| 4,942,526 | 7/1990 | Okajima et al. | 364/419 |
| 4,992,972 | 2/1991 | Brooks et al. | 364/DIG. 2 |
| 4,994,967 | 2/1991 | Asakawa | 364/419.08 |
| 5,056,021 | 10/1991 | Ausborn | 364/419 |
| 5,070,456 | 12/1991 | Garneau et al. | 364/418.08 |
| 5,146,405 | 9/1992 | Church | 364/419.08 |
| 5,276,616 | 1/1994 | Koga et al. | 364/419.08 |
| 5,280,573 | 1/1994 | Kuga et al. | 395/145 |
| 5,295,261 | 3/1994 | Simonetti | 395/600 |
| 5,301,109 | 4/1994 | Landauer et al. | 364/419.19 |
| 5,311,429 | 5/1994 | Tominaga | 364/419.01 |
| 5,321,833 | 6/1994 | Chang et al. | 395/600 |
| 5,325,298 | 6/1994 | Gallant | 364/419.19 |
| 5,333,313 | 7/1994 | Heising | 395/600 |

Primary Examiner—David M. Huntley
Assistant Examiner—A. Bodendorf
Attorney, Agent, or Firm—Melvin J. Sliwka; John L. Forrest, Jr.

[57] ABSTRACT

A Process for analyzing full-text is provided for identifying often-repeated, high user interest, word phrases in a database. Often-repeated, high user interest, word phrases are defined as pervasive theme areas (PTAs). The process also allows the relationship defined as connectivity among the various PTAs to be identified. In addition, phrases that are in proximity to the PTAs and which are strongly supportive of the PTAs are identified. Numerical indices, figure of merit, and user defined thresholds are used to quantify relations between PTAs and among PTAs and phrases.

14 Claims, 4 Drawing Sheets

SYSTEM AND METHOD FOR DATABASE TOMOGRAPHY

FIELD OF THE INVENTION

The present invention relates to database searching and particularly to full text database search methods and their mechanization and implementation.

BACKGROUND OF THE INVENTION

Due to the rapid expansion of electronic media storage capabilities, research analysts now have available massive databases of information which can be analyzed for various purposes. A major problem in practice is how to extract the essential information from these databases in a form readily amenable to analysis and interpretation. In other words, how does the analyst extract the collective wisdom contained in these large databases in a concise, readily understandable form.

The user may directly interact with the process of the present invention to select the often repeated phrases of high user interest referred to herein as pervasive theme areas (PTAs). Or, at the start of the process provide criteria for selection of the PTAs to enable the process of the present invention to define and select the PTAs from the sorted list content. Until recently, the co-word methodologies used key or index or title words as input, rather than input from the text directly. This led to universal criticism that the method input was subject to sources of bias and error from the indexing process, and the validity of the final results were questioned. In addition, the text database tended to consist of published papers, which had the index and key words. This also limited the types of text available for analysis. Recently, some progress has been reported in computer-assisted indexing using only the words found in the published literature.

Modern quantitative techniques utilize computer technology extensively, usually supplemented by network analytic approaches, and attempt to integrate disparate fields of information. One class of techniques exploits the use of co-occurrence phenomena. In co-occurrence analysis, phenomena that occur together frequently in some domain are assumed to be related, and the strength of that relationship is assumed to be related to the co-occurrence frequency. Networks of these co-occurring phenomena are constructed, and then maps of evolving topic fields are generated using the link-node values of the networks. Using these maps of structure and evolution, the information analyst can develop a deeper understanding of the interrelationships among the different information fields and the impacts of external intervention, and can recommend new directions for more desirable information portfolios.

One approach to co-occurrence analysis is co-word analysis. The origins of Co-word phenomena can be traced back to the pioneering work in: 1) lexicography to account for co-occurrence knowledge, and 2) linguistics to describe how affinity of two language units correlates with their appearance in the language.

In early co-word studies, words were classified on the basis of their co-occurrence with other words as well as their meanings. It was, however, observed that the reasons for two words co-occurring in the same context are not always relevant to a general linguistic description of a given language. The well-formedness of sentences to their lexical levels; i.e., how sensitive the meaning of a sentence is to substitution for one member of co-occurrence pair has been studied. A recent study included collocations as part of a linguistic model, whose goal was to relate any given meaning and all the texts that express it. Information retrieval research has focused on designing more efficient indexing tools using pairwise lexical affinities instead of keywords. Methods have been developed for locating interesting collocational expressions in a large body of text. These methods were based principally on the distribution of types and tokens in the body of text and on the analysis of the statistical patterns of neighboring words.

In the mid-1970s, a study was performed to examine relationships among themes in a novel using co-occurrence phenomena. An important term in the book was chosen, and a dictionary was constructed of all words in the book occurring in the same sentences as that word. A co-occurrence matrix which contained the co-occurrences among these related terms was constructed, and analyzed to eventually show the relations among all the associated terms in the mini-dictionary as they occurred in the original text. While the dictionary was restricted to single words, and the co-occurrence domain was restricted to sentences, the methodology did represent a major step forward in extracting word relations from text by their co-occurrences.

A recent update of this method employed frequency of co-occurrence to extract relatedness information from text. The study looked at co-occurrence using the sense-definition as the textual unit (entire definition of a sense of a word). The database used was the Longman Dictionary of Contemporary English (LDOCE) rather than free text. The method used single word frequencies only, and resulted in construction of networks of related words. It was concluded that co-occurrences of words in the LDOCE-controlled vocabulary in the definitions in LDOCE appeared to provide some useful information about the meanings of those words. Co-occurrences frequency correlated significantly with human judgements of relatedness, and the relatedness functions on co-occurrences yielded even higher correlations.

While the methods described above were useful for showing how relations among words and terms could be quantified and extracted from text, none were applied to extract relationships among topics of interest from large text databases.

It has been concluded in a recent study that co-word analysis may be satisfactorily performed on a set of documents by using either title words or keywords and that the main difference between results obtained is that keywords provided a much more detailed account of the subject studied for the case in point.

While there has been some progress in overcoming the dependency of co-word analysis on key or index words, limitations remain. From the above it is clear that the prior art has taken many varied approaches to search out related topic information from individual or multiple target databases. In light of the various problems and limitations of the foregoing approaches a simpler methodology less dependent on user bias and influences was imperative.

SUMMARY OF THE INVENTION

It is thus an object of the present invention to provide a database search methodology that is less dependent upon or eliminates user input bias.

It is yet another object of the present invention to eliminate the need for user specified search criteria such as keyword requirements.

It is further another object of the present invention to provide a search methodology capable of performing upon full-text database elements.

It is still another object of the present invention to provide a data-base search methodology employing co-word relationships.

The present invention is a system and method of performing full-text data base analyses without the requirement for any key or index words. The database may include any form of combination of forms of text, be it published article, report, or memo. The invention is the most direct means of extracting messages from large textual databases without relying on interpreting intermediate abstractions of text such as citations, key or index words, or titles.

The invention provides a revolutionary approach for identifying often-repeated phrases (a phrase in the present context is from one to "N" words, e.g., [METAL, METAL MATRIX, OR METAL MATRIX COMPOSITES], etc.) in any size document or combination of documents (defined as the database). Those often-repeated phrases which also have high interest to the user(s) of the invention can be defined as pervasive theme areas (PTA). The invention allows the relationships (defined as connectivity) among these PTA to be identified. The invention also allows phrases which are in close physical proximity to the PTA, and which are strongly supportive of the PTA, to be identified. The PTA can be research areas of emphasis, organizations, journals, people, patents, etc. A major unique feature of this invention is that the database consists of full text (any combination of journal papers, reports, memos, written speeches, etc.), not abstractions of text such as key words or index words, as previous methods have used. The full text method displays the richness of the fine structure relations in the text, and provides orders of magnitude more detail and useful information than the methods which rely on key or index words.

DETAILED DESCRIPTION OF THE DRAWINGS

DETAILED DESCRIPTION

Figure 1:
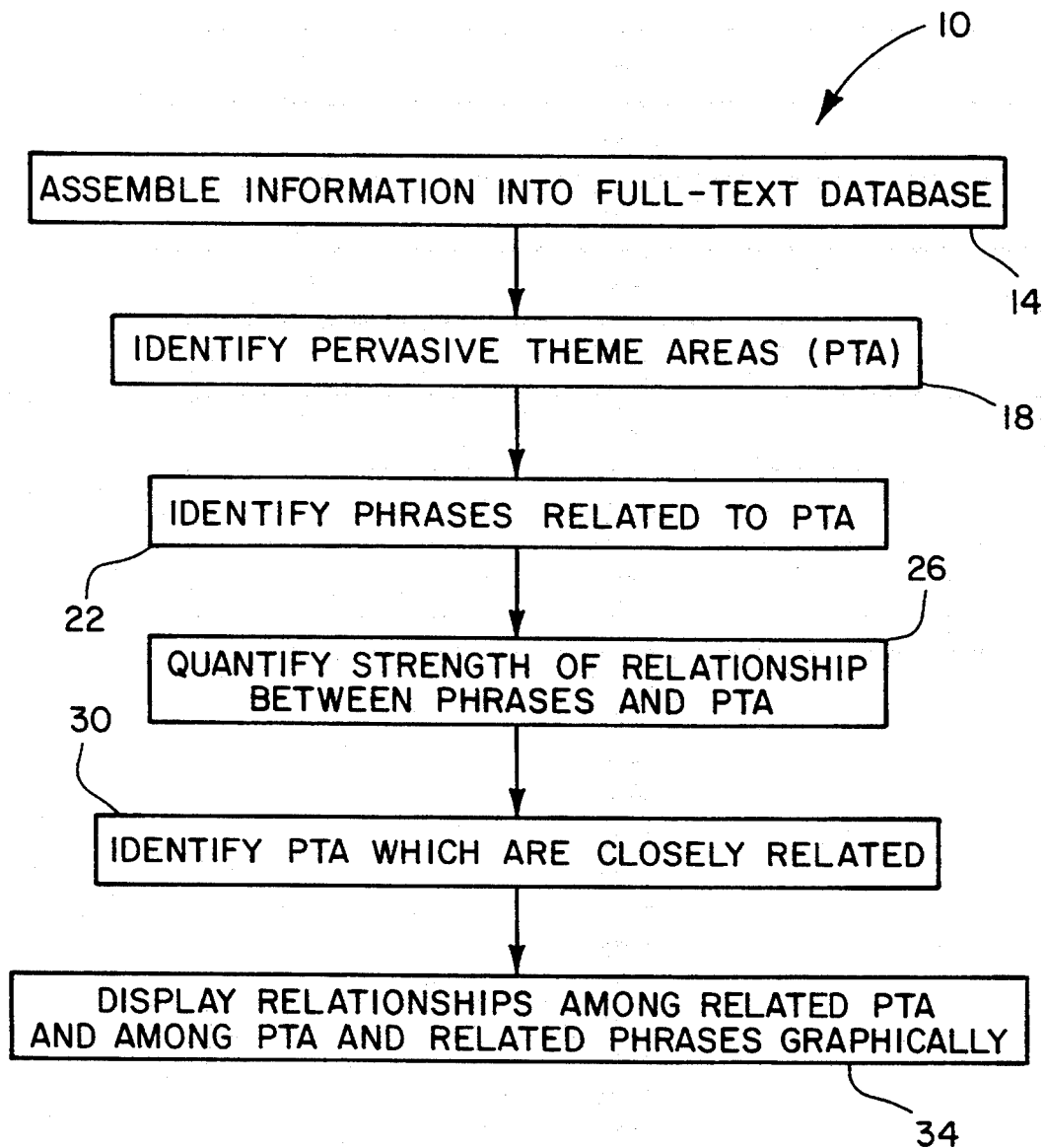
FIG. 1 is a functional block diagram of the method of the present invention.

The present invention is a system and method as shown in FIG. 1. The system employs a scanner for digitizing document information content or other means for creating a data base in digital form. A computer program, for example as shown in Appendix A, can be used to make possible digital execution of the methodology of the present invention by means of a digital computer. A number of functions of the methodology of the present invention may be performed by human interaction. In the alternative a fully automated form of the system can perform all functions without human interaction where it is desirable to have the computer controlling the method of the invention by developing thresholds, numerical indices, figures of merit and other means of quantitative measurement directly from the database content itself. To those skilled in the art, manual data entry, optical scanning, and verbal input are means for information or data entry to a database of the type envisioned for application by the invention. Likewise any number of means for performing the functions of the invention including various types of digital computers and means for presenting or displaying the output of the inventions methodology may be used.

Referring to block 14 in FIG. 1 the invention 10 as depicted requires as a first step the assembly of information of interest to the user in a full-text database. Journals, papers, memos, reports, patents, and police records are just a few examples of the unlimited variety of documents that may be introduced into a database. The database may, of course, contain one or a combination of two or more documents. In the preferred embodiment of the invention the documents of interest are stored, regardless of the means of entry, on electronic media such as hard or floppy disk. CD-ROM, optical, and other high-density, rapid access storage media is also preferred for the system. Each individual or combination of documents may occupy a separate computer file in the system. In a preferred embodiment storage of digitally introduced documents has been in ASCII files. Other types of files will be dictated by the types of computer processing and the programs employed.

In the discussion that follows a phrase is defined as one or more words, where a word is used in the usual sense such as "the printed word". More specifically a phrase is one word, adjacent double words, adjacent triple words . . . to adjacent m*words. Thus a single word phrase might be "metal"; an adjacent double word phrase "metal matrix", and an adjacent triple word phrase "metal matrix composite".

The user is required to prepare a list of trivial phrases, e.g. it, to, if, and, but, etc., that the user wishes to have excluded from the database as it is subjected to the invention's methodology. In the preferred embodiment the number of trivial phrases that can be selected is unlimited except for limitations imposed by computer memory size. The system can exclude trivial phrases at any time, however, in a preferred embodiment trivial phrases are excluded immediately prior to or during processing to identify pervasive theme areas discussed hereinafter.

Figure 2:
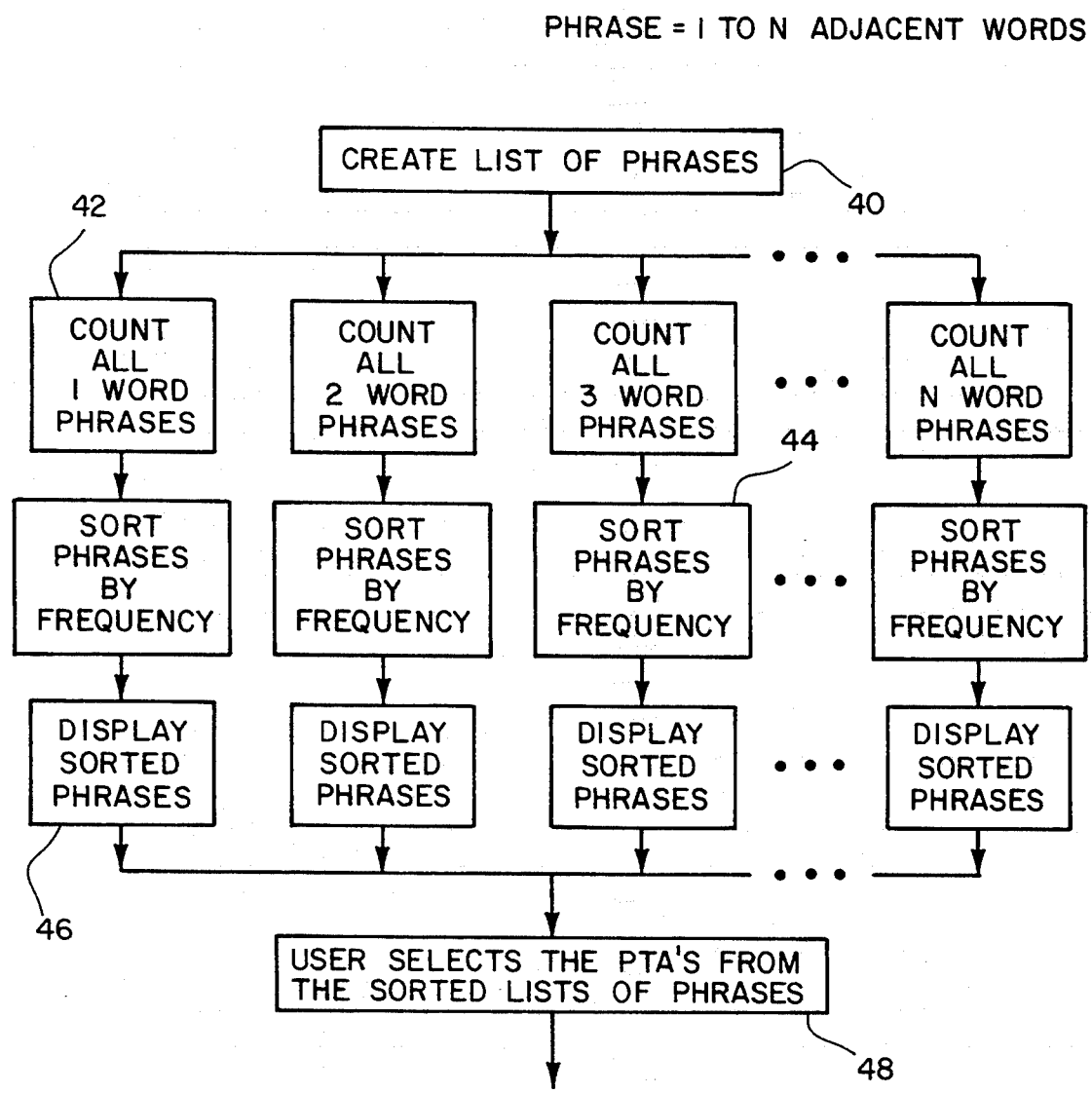
FIG. 2 is a functional block diagram expanding on Block 18 of FIG. 1.

The next step in the method of the present invention is the identification of pervasive theme areas (PTAs) as depicted in block 18 of FIG. 1 and in FIG. 2. Thus the system and methodology are required to use the entire full-text database to create lists of phrases as at 40 in FIG. 2. More specifically the system and methodology require that separate lists of all one (1) word phrases, adjacent two (2) word phrases, adjacent three (3) word phrases . . . and adjacent n*word phrases be prepared. The phrases in each list are then counted as in 42 and then sorted in order in each list by frequency of occurrence as shown in 44 and in Table 1. The user, of course, can as an option sort the phrases alphabetically by consecutive word order in the phrase, i.e. e.g., first word, or second word, or through to the last word. The sorted phrases are then displayed as at 46 by any of various means known to those skilled in the art such as print-out list or graphs or video means to permit user interaction as at 48.

At 48 FIG. 2 the user selects pervasive theme areas (PTAs) which are often repeating phrases in the data base of high user interest. See Table 2.

TABLE 1

HIGH FREQUENCY SINGLE WORDS FROM FASAC

| FREQ | WORD | FREQ | WORD | FREQ | WORD |
|---|---|---|---|---|---|
| 4170 | SYSTEMS | 2611 | PHYSICS | 2351 | OPTICAL |
| 4139 | INSTITUTE | 2587 | WAVES | 2314 | TIME |
| 2883 | COMPUTER | 2564 | MOSCOW | 2268 | MATERIALS |
| 2764 | DATA | 2466 | CONTROL | 2248 | SURFACE |

HIGH FREQUENCY DOUBLE WORDS FROM FASAC

| FREQ | WORD | FREQ | WORD |
|---|---|---|---|
| 2982 | SOVIET UNION | 0246 | AKADEMII NAUK |
| 0634 | SHOCK WAVES | 0243 | MAGNETIC FIELD |
| 0503 | INTERNAL WAVES | 0216 | CONTROL AVTOMATIKA |
| 0461 | QUANTUM ELECTRON | 0207 | RADIO WAVES |
| 0425 | PHASE CONJUGATION | 0193 | FREQUENCY STANDARDS |
| 0375 | REMOTE SENSING | 0176 | CATALYSIS KINETIKA |
| 0374 | IMAGE PROCESSING | 0171 | PARTICLE ACCELERATORS |

HIGH FREQUENCY TRIPLE WORDS FROM FASAC

| FREQ | WORD | FREQ | WORD |
|---|---|---|---|
| 0371 | EXPLOS SHOCK WAVES | 0112 | STIMULATED BRILLOUIN SCATTERING |
| 0159 | CHARGED PARTICLE ACCELERATORS | | |
| 0134 | VYCHISLITEL NAYA TEKHNIKA | 0095 | ATOMIC ENERGY INSTITUTE |
| 0127 | SPATIAL LIGHT MODULATORS | | |
| 0127 | IZVESTIYA AKADEMII NAUK | 0073 | OPTICAL PHASE CONJUGATION |
| 0115 | IMAGE PATTERN RECOGNITION | 0071 | FUELS AND OILS |
| | | 0068 | SPACE RESEARCH INSTITUTE |
| | | 0064 | SYNTHETIC APERTURE RADAR |
| | | 0060 | VYCHISLITEL NOY MATEMATIKI |
| | | 0054 | SOVIET ASTRONOMY LETTERS |

TABLE 2

FASAC TECHNICAL THEMES

| | |
|---|---|
| INTERNAL WAVE | SEA SURFACE |
| SHOCK WAVE | COMPOSITE MATERIAL |
| QUANTUM ELECTRON | CROSS SECTION |
| PHASE CONJUGATION | INTEGRAL EQUATION |
| REMOTE SENSING | SOLID FUEL |
| IMAGE PROCESSING | BOUNDARY LAYER |
| PATTERN RECOGNITION | PLASMA PHYSICS |
| OCEANIC PHYSICS | COMPUTER SOFTWARE |
| RADIO WAVE | LIQUID CRYSTAL |
| MAGNETIC FIELD | DATA PROCESSING |
| COMPUTER SCIENCE | NEUTRAL BEAM |
| HYDROGEN MASER | DIGITAL COMPUTER |
| REMOTE CONTROL | ELECTRIC FIELD |
| FREQUENCY STANDARD | ELECTROMAGNETIC WAVE |
| SIGNAL PROCESSING | LOW OBSERVABLE |
| ARTIFICIAL INTELLIGENCE | PARALLEL PROCESSING |
| LIGHT MODULATOR | AUTOMATIC CONTROL |
| SURFACE WAVE | ATOMIC ENERGY |
| RADIO ENGINEERING | WAVE PROPAGATION |
| CONTROL SYSTEM | IONOSPHERIC MODIFICATION |
| CHARGED PARTICLE | FRACTURE MECHANICS |
| DIFFERENTIAL EQUATION | CHEMICAL PHYSICS |
| OPTICAL PROCESSING | HIGH-POWER MICROWAVE |
| PARTICLE ACCELERATOR | EXPLOS SHOCK WAVE |
| THIN FILM | KINETICS AND CATALYSIS |
| PROGRAMMING LANGUAGE | EXPLOSION AND SHOCK |
| STRENGTH MATER | SPATIAL LIGHT MODULATOR |
| COMPUTER VISION | CHARGED PARTICLE ACCELERATOR |
| ELECTRON BEAM | ATMOS OCEANIC PHYS |
| DATA BASE | MOLECULAR ELECTRONIC |

The user may directly interact with the process of the present invention to select the often repeated phrases of high user interest (PTAs). Or, at the start of the process provide criteria for selection of the PTAs to enable the process of the present invention to define and select the PTAs from sorted list content. Many applications of the invention to date have focused on identifying PTA in databases which describe sponsored research programs. In these cases, phrases of high user interest are words which have high technical content, e.g., REMOTE SENSING, SIGNAL PROCESSING, HIGH TEMPERATURE SUPERCONDUCTOR. Thus, the selection of PTAs in some database analyses performed by the invention have used, for example, the 60 most often repeated phrases of high user interest as PTA. More or less than 60 phrases per PTA can be used, and, as stated above this can be determined by user interaction or pre-processing user supplied criteria for system definition of PTA composition.

Figure 3:
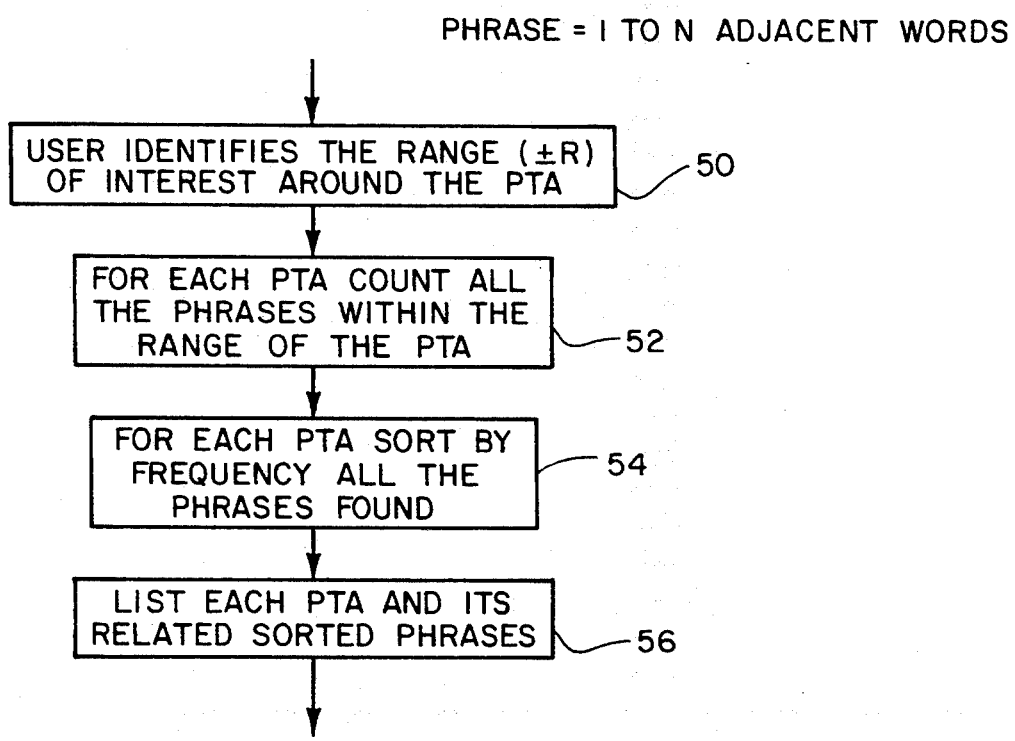
FIG. 3 is a functional block diagram expanding on Block 22 of FIG. 1.

The invention next identifies all phrases related to each PTA as depicted in 22 of FIG. 1 and FIG. 3. As shown at 50 the user identifies a range R of interest of plus or minus a number of single words about each PTA for the purpose of extracting phrases from the full-text database which occur physically close to the PTA. The invention has been found to produce good results using a set range of 150 single words of the PTA. It should be understood that selection of the size and range about the PTA is at the discretion of the user and may depend on the characteristics of the database. Next, for each PTA count all the phrases within the range of the PTA as depicted at 52 in FIG. 3. Sort by frequency of occurrence all phrases found for each PTA as depicted at 54. See Table 3.

TABLE 3

150($C_j$) REMOTE SENSING PTA - CLOSELY RELATED PHRASES

| $C_{ij}$ | $C_i$ | |
|---|---|---|
| 139 | 2764 | DATA |
| 022 | 0036 | THERMAL INFRARED |
| 120 | 0879 | REMOTE |
| 056 | 0323 | ICE |
| 079 | 2593 | LITERATURE |
| 070 | 0522 | SATELLITE |
| 041 | 0228 | OCEANOGRAPHIC |
| 012 | 0020 | ATMOSPHERIC CORRECTIONS |
| 065 | 2287 | UNTIED |
| 109 | 1707 | SPACE |
| 012 | 0024 | AEROSOL OPTICAL |
| 012 | 0025 | IMAGING SYSTEMS |
| 006 | 0007 | MICROWAVE SENSORS |
| 062 | 2239 | UNITED STATES |
| 074 | 1072 | RADAR |
| 012 | 0037 | VEGETATION |

CODE: $C_{ij}$ IS CO-OCCURRENCE FREQUENCY, OR NUMBER OF TIMES PHRASE APPEARS WITHIN +/- 50 WORDS OF PTA IN TOTAL TEXT; $C_i$ IS ABSOLUTE OCCURRENCE FREQUENCY OF PHRASE; $C_j$ IS ABSOLUTE OCCURRENCE FREQUENCY OF PTA.

Next, list each PTA and its related sorted list of phrases as at 56. See Table 3.

Figure 4:
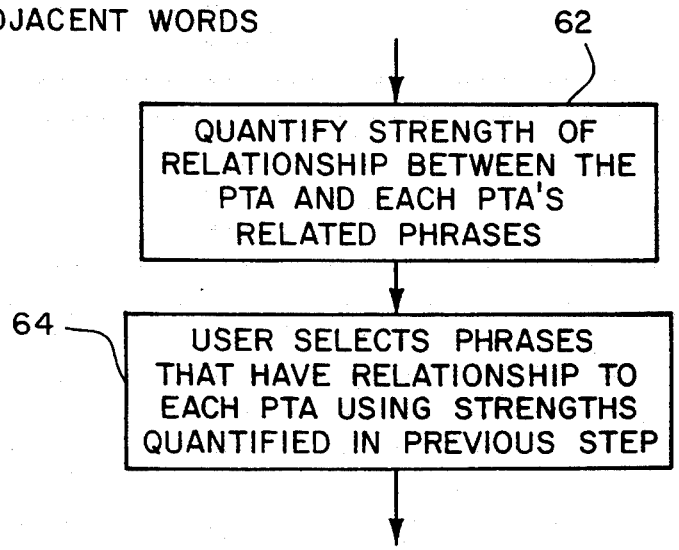
FIG. 4 is a functional block diagram expanding on Block 26 of FIG. 1.

The invention next quantifies the strength of relationship between extracted phrases and each pervasive theme area (PTA) as depicted at 26 in FIG. 1 and 62 in FIG. 4. The user must first define, develop, and provide numerical indices and figures of merit for each of the extracted phrases. Examples of indices used in a preferred embodiment include the absolute frequency of occurrence of the PTA designated $C_j$, the absolute frequency of occurrence of the extracted phrases, $C_i$, and the extracted phrases within a set range of single words of the PTA designated $C_{ij}$.

Examples of figures of merit used include the following ratios of the frequencies of occurrence described above: $C_{ij}/C_i$, $C_{ij}/C_j$, and $(C_{ij}^2)/(C_i*C_j)$ where ^2 denotes squared and * denotes multiplication by. Other numerical indices and figures of merit may be used instead of or in addition to those described above. Table 3 shows the results of the quantification function of the invention. The user is thus in a position at 64 in FIG. 4 to select phrases that have a relationship to each PTA having determined relationships strengths based on quantifications obtained by applying the above numerical indices and figures of merit.

Figure 5:
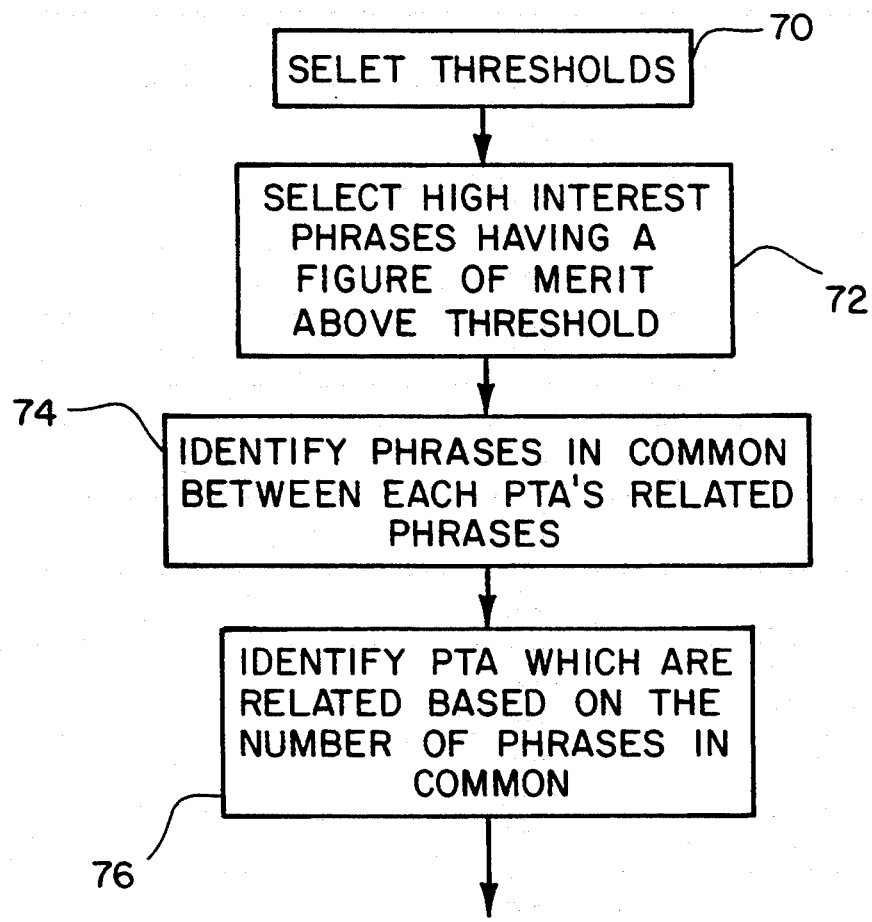
FIG. 5 is a functional block diagram expanding on Block 30 of FIG. 1.

Pervasive theme areas (PTAs) which are closely related are next identified by the invention as depicted at 30 in FIG. 1 and in FIG. 5. The user is required to have defined and provided threshold values above some predetermined number of the figures of merit for selecting phrases of high user interest. In the presently embodied invention the selection of threshold values for the identification of closely related PTAS is at the discretion of the user. The system can, however, be implemented to select threshold values based on an automated analysis of the full-text database being operated upon. The user or system can then select phrases of high interest whose figures of merit are above the threshold. See Table 4.

TABLE 4

150($C_j$) REMOTE SENSING PTA - CLOSELY RELATED PHRASES

| $C_{ij}$ | $C_i$ | $I_i$ $C_{ij}{}^\wedge 2/C_i$ | $E_{ij}$ $C_{ij}{}^\wedge 2/C_iC_j$ | PTA MEMBER |
|---|---|---|---|---|
| 022 | 0036 | 0.611 | 0.0359 | THERMAL INFRARED |
| 056 | 0323 | 0.173 | 0.0259 | ICE |
| 070 | 0522 | 0.134 | 0.0250 | SATELLITE |
| 041 | 0228 | 0.180 | 0.0197 | OCEANOGRAPHIC |
| 012 | 0020 | 0.600 | 0.0192 | ATMOSPHERIC CORRECTIONS |
| 109 | 1707 | 0.064 | 0.0186 | SPACE |
| 012 | 0024 | 0.500 | 0.0160 | AEROSOL OPTICAL |
| 006 | 0007 | 0.857 | 0.0137 | MICROWAVE SENSORS |
| 074 | 1072 | 0.069 | 0.0136 | RADAR |
| 012 | 0037 | 0.324 | 0.0104 | VEGETATION |

CODE: $C_{ij}$ IS CO-OCCURRENCE FREQUENCY, OR NUMBER OR TIMES PHRASE APPEARS WITHIN +/- 50 WORDS OF PTA IN TOTAL TEXT; $C_i$ IS ABSOLUTE OCCURRENCE FREQUENCY OF PHRASE; $C_j$ IS ABSOLUTE OCCURRENCE FREQUENCY OF PTA PHRASE; $I_i$, THE INCLUSION INDEX BASED ON PHRASE, IS RATIO OF $C_{ij}$ TO $C_i$ AND $E_{ij}$, THE EQUIVALENCE INDEX, IS PRODUCT OF INCLUSION INDEX BASED ON PHRASE $I_i(C_{ij}/C_i)$ AND INCLUSION INDEX BASED ON PTA $I_j(C_{ij}/C_j)$.

The commonality, i.e. the degree of similarity or close relatedness, of extracted phrases among the different PTA is next computed to identify phrases in common between each PTA's related phrases as at 74 in FIG. 5. In the preferred embodiment of the present invention commonality was defined as the numbers of phrases in common among PTA, and in particular the number of extracted phrases in common between all the PTAs. Other definitions of commonality may, of course, be formulated.

PTA which are related based upon the number of phrases in common are next identified as at 76 in FIG. 5. Specifically groups of PTA are generated such that each PTA in a given group has extracted phrases in common with at least one other PTA in the group. See Table 5.

TABLE 5

| | PTA GROUP 9 (PARTIAL) | |
|---|---|---|
| RADIO ENGINEERING PTA | ELECTROMAG. WAVES PTA | CROSS SECTION PTA |
| QUANTUM ELECTRONICS | QUANTUM ELECTRONICS | |
| DIFFRACTION | DIFFRACTION | |
| MICROWAVE | MICROWAVE | |
| THIN PLASMA LAYER | THIN PLASMA LAYER | |
| RADAR | RADAR | RADAR |
| | SCATTERING | SCATTERING |
| | PLASMA | PLASMA |
| SPECTROSCOPY | | |
| ATOMIC ENERGY | | |
| MOLECULAR BEAM | | |
| MESON FACTORY | | |
| | IMPEDANCE | |

TABLE 5-continued

| RADIO ENGINEERING PTA | PTA GROUP 9 (PARTIAL) ELECTROMAG. WAVES PTA | CROSS SECTION PTA |
|---|---|---|
| | RESONANCE DIELECTRIC CONSTANT | |
| | | COATED BODIES FLAME TUBE PLANE WAVE PULSE ANTENNA |

In a preferred embodiment each PTA in a group contains extracted phrases in common beyond some predetermined threshold value with at least one other PTA in the group. Other inclusion or membership criteria may be used.

Finally, as shown in FIG. 1, the relationships among related PTA and among PTA and related phrases are graphically displayed. In a preferred embodiment groups of related PTAs with each PTA in the group are listed. A generic title is used for each PTA group. See Table 6.

TABLE 6

GROUPS OF CLOSELY RELATED PHRASES

GROUP 1. IONOSPHERIC HEATING/MODIFICATION: *RADIO WAVE; *WAVE PROPAGATION; *QUANTUM ELECTRON; *IONOSPHERIC MODIFICATION; *PHASE CONJUGATION.

GROUP 2. IMAGE/OPTICAL PROCESSING: *PARALLEL PROCESSING; *PATTERN RECOGNITION; *IMAGE PROCESSING; *COMPUTER VISION; *DIGITAL COMPUTER; *ARTIFICIAL INTELLIGENCE; *DATA PROCESSING; *COMPUTER SCIENCE; *OPTICAL PROCESSING; *SPATIAL LIGHT MODULATOR; *SIGNAL PROCESSING; *LIQUID CRYSTAL; *LIGHT MODULATOR; *PROGRAMMING LANGUAGES; *INTEGRAL EQUATIONS.

GROUP 3. AIR-SEA INTERFACE: *SURFACE WAVE; *OCEANIC PHYSICS; *INTERNAL WAVE; *SEA SURFACE; *BOUNDARY LAYER; *ATMOS OCEANIC PHYS; *REMOTE SENSING.

GROUP 4. LOW OBSERVABLE: *LOW OBSERVABLE; *THIN FILM.

GROUP 5. EXPLOSIVE COMBUSTION: *KINETICS AND CATALYSIS; *SOLID FUEL; *EXPLOSION AND SHOCK; *SHOCK WAVE; *CHEMICAL PHYSICS; *EXPLOS SHOCK WAVE; *STRENGTH MATER; *FRACTURE MECHANICS; *COMPOSITE MATERIALS.

GROUP 6. PARTICLE BEAMS: *NEUTRAL BEAM; *PARTICLE ACCELERATOR; *ATOMIC ENERGY; *PLASMA PHYSICS; *ELECTRON BEAM; *CHARGED PARTICLE ACCELERATOR; *CHARGED PARTICLE.

GROUP 7. AUTOMATIC/REMOTE CONTROL: *AUTOMATIC CONTROL; *REMOTE CONTROL

GROUP 8. FREQUENCY STANDARDS: *FREQUENCY STANDARD; *HYDROGEN MASER

GROUP 9. RADAR CROSS SECTION: *CROSS SECTION; *ELECTROMAGNETIC WAVE; *RADIO ENGINEERING.

Other relational display mechanisms such as Venn-type diagrams may be used in the alternative. Also in a preferred embodiment the graphical display of the relationship between each PTA and its extracted phrases present the extracted phrases assigned to quadrants based on the magnitudes of the two figures of merit $(C_{ij}/C_i)$ and $(C_{ij}/C_j)$. Each quadrant depicts a specific type of relationship between the PTA and the extracted phrases in that quadrant. See Table 7.

TABLE 7

| ATMOS OCEANIC PHYS PTA - HIGH TECHNICAL CONTENT PHRASES | | | |
|---|---|---|---|
| HIGH $I_j$ LOW $I_i$ (LEFT QUADRANT) | | | LOW $I_j$ HIGH $I_i$ (RIGHT QUADRANT) |
| | HIGH $I_j$ HIGH $I_i$ (UPPER QUADRANT) | | |
| SEA INTERNAL WAVE ACOUSTIC SCATTERING RADAR SEA SURFACE ATMOSPHERE | | | RADIOACOUSTIC SOUNDING ACOUSTIC SOUNDING THEORY OF WIND MODELING OF SURFACE WIND WAVES ATMOS INTRASOUND AND INTERNAL THEORY OF WAVE |
| | LOW $I_j$ LOW $I_i$ (BOTTOM QUADRANT) | | |
| WIND WAVES SOUND PROPAGATION OCEAN SURFACE GRAVITY WAVES STRATIFIED FLUID | SHEAR FLOW TURBULENT SATELLITE INTERNAL GRAVITY WAVES SOUND WAVES | | PROCESSING OF RADAR WAVE PROPAGATION WIND VELOCITY POINT SOURCE |

Alternative means for displaying relationships would include, but not be limited to, two or three-dimensional plots of the relationship between each PTA and its extracted phrases using figures of merit of the extracted phrases as plotting variables.

The invention as described is easily mechanized using a variety of existing hardware elements such as optical scanners computers and displays. A program used by the system of the present invention to implement the full-text database process of the present invention appears in the Appendix to this specification. The code was written in Think Pascal ™ on the Macintosh. The Macintosh was chosen for the user interface, speed, and memory management capabilities. An application on a Macintosh can access all of the free memory management capabilities of the machine without any limitations like the 640K "barrier" on IBM PC's. Think Pascal ™ was chosen as the programming language because of its efficient compiler and powerful debugger.

The variable and procedure names indicate what they are used for. There are a few subtleties that should be understood. First, whenever a list is mentioned in the block diagrams of the process it is implemented using a balanced binary tree. The main advantages of a binary tree are the fast search time and dynamic memory allocation. Each time the binary tree is changed it is checked to see that all branches are close to the same length. By doing this it should be understood that to search for a given item in a tree containing n items will take at most $\log_n(n)$ comparisons. This is much better than n/2 for a sort list. The fact that the tree is made up of individual data structures linked together by pointers means that the user doesn't have to know how big the tree will get. The user simply has to know if there is enough memory to add the nest item to the tree. Second, there is no double counting of words.

It should be understood that there are numerous variations and modifications of the invention that will be readily apparent to those skilled in the art in light of the above teachings. It is, therefore, to be understood that, within the scope of the appended claims, the invention may be practiced other than as specifically described.

APPENDIX

```
unit Tree;
interface const
    version = 'Text Slicer Version : August 19, 1992';
    TabChar = chr(9);
    MaxWords = 3;
    WordSize = 25;
    PhraseSize = WordSize * MaxWords + MaxWords - 1;
    EmptySize = 16;
    MaxRange = 100;
    MaxRange2 = MaxRange + 2;
    MaxCoWords = 150;
    TaggedSize = MaxCoWords div 32;
    TextBufferSize = 5000;
    TextBufferLimit = 4500;
    MyFileCreator = 'MSWD';
    MyFileType = 'TEXT';
  type
    TextBuffer = packed array[1..TextBufferSize] of CHAR;
    word_type = string[WordSize];
    phrase_type = string[PhraseSize];
    Word_list = array[-MaxRange2..MaxRange2] of word_type;
    TagWord_list = array[-MaxRange2..MaxRange2] of LongInt;
    CoWordHndl = ^CoWordPtr;
    CoWordPtr = ^CoWord_array;
    CoWord_array = array[1..MaxCoWords, 1..MaxCoWords] of Integer;
    TagWordHndl = ^TagWordPtr;
    TagWordPtr = ^TagWord_array;
    TagWord_array = array[1..MaxCoWords, 1..MaxCoWords] of LongInt;

key_type = phrase_type;
    balance_factor = (LH, EH, RH);
    nodeHndl = ^nodePtr;
    nodePtr = ^nodeRecord;
    nodeRecord = record
      left, right: nodeHndl;
      count: Integer;
      bf: balance_factor;
      tag: LongInt;
      key: key_type;
    end;
{------------------------------------------------------------------}
  procedure HaltOSError (error: str255;
           macErr: OSErr;
           s1, s2: str255);
  function valid_char (ch: char): Boolean;
```

```
     function next (var stemp: str255): str255;
{* function TypeOfChar (ch: char): Integer;*}
{* function NextWord (var buffer: TextBuffer;*}
{*       var first, last: Integer;*}
{*       var EndOfLine: Boolean): str255;*}
{* procedure NextLine (var buffer: TextBuffer;*}
{*       var first, last: Integer;*}
{*       var EndOfLine: Boolean);*}
{* procedure ReadBuffer (var infile, first, last: integer;*}
{*       var buffer: TextBuffer;*}
{*       var EndOfFile: Boolean;*}
{*       var TotalCount: LongInt);*}
  procedure Kill_tree (var root: nodeHndl);
  procedure InsertNode (var root: nodeHndl;
         newnode: nodeHndl;
         mode: Integer;
         var taller: Boolean);
  procedure DeleteNode (var root: nodeHndl;
         target: key_type;
         mode, count: Integer;
         var shorter: BOOLEAN);
  procedure NumberNodes (p: nodeHndl;
         var nodeNumber: Integer);
  function FindFirst (p: nodeHndl): nodeHndl;
  procedure ChangeOrder1to2 (var p1: nodeHndl);
  procedure ChangeOrder2to3 (var p1: nodeHndl);
  procedure FindNode (root: nodeHndl;
         var newnode: nodeHndl;
         target: key_type);
  procedure FindNumberedNode (root: nodeHndl;
         var newnode: nodeHndl;
         NoneNumber: Integer);
  procedure IncrementNode (var root: nodeHndl;
         str: key_type);
  procedure InitTagWord_list (var WordsTag: TagWord_list;
         Range: Integer);
  procedure ShiftTagWord_list (var WordsTag: TagWord_list;
         Range: Integer);
  procedure InitTaggedWord_array (var TaggedWords: TagWordHndl;
         NumberOfNodes: Integer);
  procedure InitWordList (var Words: Word_list;
         Range: Integer);
  procedure ShiftWords (var Words: Word_list;
         str: word_type;
         Range: Integer);
  procedure InitCoWord_array (var CoWords: CoWordHndl;
         NumberOfNodes: Integer);
  function NonTrivial1 (var TrivialRoot: nodeHndl;
         sTemp: str255): Boolean;
  function NonTrivial2 (sTemp: str255): Boolean;
  procedure IncrementArray1 (var CoWords: CoWordHndl;
         var root: nodeHndl;
         var Words: Word_list;
         row, NumWords, Range: Integer);
  procedure IncrementArray2 (var CoWords: CoWordHndl;
         var root: nodeHndl;
         var Words: Word_list;
         var WordsTag: TagWord_list;
         row, NumWords, Range: Integer;
         var TaggedWords: TagWordHndl);
  function MyFileFilter1 (paramBlock: ParmBlkPtr): Boolean;
  function PathNameFromDirID (DirID: longint;
         vRefNum: integer): str255;
  function do_getfile: str255;
  function do_putfile (prompt: str255): str255;

{----------------------------------------------------------------}
```

```
implementation
{---------------------------------------------------------------}
{---------------------------------------------------------------}
 procedure HaltOSError (error: str255;
          macErr: OSErr;
          s1, s2: str255);
  var
   errNum: Str255;
   temp: integer;
 begin
  NumToString(macErr, errNum);
  ParamText(error, errNum, s1, s2);
  InitCursor;
  temp := StopAlert(129, nil);
  Halt;
 end;

{---------------------------------------------------------------}
 function valid_char (ch: char): Boolean;
 begin
   case ch of
    '-':
     valid_char := TRUE;
    '0'..'9':
     valid_char := TRUE;
    'A'..'Z', 'a'..'z':
     valid_char := TRUE;
    otherwise
     valid_char := FALSE;
   end; {case}
 end;

{---------------------------------------------------------------}
 function next (var stemp: str255): str255;
  var
   i, j, l, p1, p2, p3: Integer;
 begin
  i := 1;
  p1 := 1;
  p2 := 0;
  p3 := 0;
  l := length(stemp);
  while not valid_char(stemp[i]) and (i <= l) do
   begin
    i := i + 1;
    p1 := i;
   end;
  while valid_char(stemp[i]) and (i <= l) do
   begin
    p2 := i;
    i := i + 1;
   end;
  while not valid_char(stemp[i]) and (i <= l) do
   begin
    p3 := i;
    i := i + 1;
   end;
  if p2 = 0 then
   p2 := i;
  if p3 = 0 then
   p3 := i;
  if p2 >= p1 then
   begin
    next := copy(stemp, p1, p2 - p1 + 1);
    delete(stemp, 1, p3);
   end;
 end; {next}
```

```
{-----------------------------------------------------------------------}
 function TypeOfChar (ch: char): Integer;
   const
     CR = chr(13);
 begin
   case ch of
     CR:
       TypeOfChar := 1;
     'A'..'Z', 'a'..'z', '0'..'9', '-':
       TypeOfChar := 2;
     otherwise
       TypeOfChar := 0;
   end; {case}
 end; {TypeOfChar}

{-----------------------------------------------------------------------}
 function NextWord (var buffer: TextBuffer;
           var first, last: Integer;
           var EndOfLine: Boolean): str255;
   var
     str: str255;
 begin
   EndOfLine := FALSE;
   str := '';
   while (TypeOfChar(buffer[first]) = 0) and (first <= last) do
     begin
       first := first + 1;
     end;
   if (TypeOfChar(buffer[first]) = 1) then
     begin
       EndOfLine := TRUE;
       first := first + 1;
     end;
   while (TypeOfChar(buffer[first]) = 2) and (first <= last) and not EndOfLine do
     begin
       str := Concat(str, buffer[first]);
       first := first + 1;
     end;
   if (TypeOfChar(buffer[first]) = 1) then
     begin
       EndOfLine := TRUE;
       first := first + 1;
     end;
   NextWord := str;
 end; {NextWord}

{-----------------------------------------------------------------------}
 procedure NextLine (var buffer: TextBuffer;
           var first, last: Integer;
           var EndOfLine: Boolean);
   var
     str: str255;
 begin
   EndOfLine := FALSE;
   while (TypeOfChar(buffer[first]) <> 1) and (first <= last) do
     begin
       first := first + 1;
     end;
   if (TypeOfChar(buffer[first]) = 1) then
     begin
       EndOfLine := TRUE;
       first := first + 1;
     end;
 end; {NextLine}

{-----------------------------------------------------------------------}
 procedure ReadBuffer (var infile, first, last: integer;
```

```
      var buffer: TextBuffer;
      var EndOfFile: Boolean;
      var TotalCount: LongInt);
var
  err, err1: OSErr;
  count1, count2: LongInt;
begin
  count1 := TextBufferSize - first + 1;
  count2 := count1;
  err := FSRead(infile, count2, @buffer[first]);
  if (err = noErr) or (err = eofErr) then
    begin
      if (count1 = count2) and not (err = eofErr) then
        begin
          last := first + count2 - 1;
        end {if count = size}
      else
        begin
          EndOfFile := TRUE;
          last := first + count2 - 1;
        end; {if count = size}
    end {if err=noErr}
  else
    begin
      err1 := FSClose(infile);
      HaltOSError('FSRead error', err, '', '');
    end; {if err<>noErr}
  TotalCount := TotalCount + count2;
end; {ReadBuffer}

{---------------------------------------------------------------}
procedure Kill_tree (var root: nodeHndl);
  procedure Kill_subtree (var p: nodeHndl);
  begin
    if p <> nil then
      begin
        Kill_subtree(p^^.left);
        Kill_subtree(p^^.right);
        DisposHandle(HANDLE(p));
      end;
  end; {Kill_subtree} begin
  if root <> nil then
    begin
      Kill_subtree(root^^.left);
      Kill_subtree(root^^.right);
      DisposHandle(HANDLE(root));
{*    root := nil*}
    end;
end; {Killtree}

{---------------------------------------------------------------}
procedure RotateLeft (var p: nodeHndl);
  var
    temp: nodeHndl;
begin
  if p = nil then
    WriteLn('Error')
  else if p^^.right = nil then
    WriteLn('Error')
  else
    begin
      temp := p^^.right;
      p^^.right := temp^^.left;
      temp^^.left := p;
      p := temp;
```

```
      end;
   end; {RotateLeft}

{---------------------------------------------------------------}
   procedure RotateRight (var p: nodeHndl);
      var
         temp: nodeHndl;
   begin
      if p = nil then
         WriteLn('Error')
      else if p^.left = nil then
         WriteLn('Error')
      else
         begin
            temp := p^.left;
            p^.left := temp^.right;
            temp^.right := p;
            p := temp;
         end;
   end; {RotateRight}

{---------------------------------------------------------------}
{---------------------------------------------------------------}
   procedure InsertNode (var root: nodeHndl;
                         newnode: nodeHndl;
                         mode: Integer;

var taller: Boolean);
      var
         taller_subtree: Boolean;

{---------------------------------------------------------------}
      procedure LeftBalance;
         var
            x, w: nodeHndl;
      begin
         x := root^.left;
         case x^.bf of
            LH:
               begin
                  root^.bf := EH;
                  x^.bf := EH;
                  RotateRight(root);
               end;
            EH:
               WriteLn('Error');
            RH:
               begin
                  w := x^.right;
                  case w^.bf of
                     EH:
                        begin
                           root^.bf := EH;
                           x^.bf := EH;
                        end;
                     RH:
                        begin
                           root^.bf := EH;
                           x^.bf := LH;
                        end;
                     LH:
                        begin
                           root^.bf := RH;
                           x^.bf := EH;
                        end;
                  end;
                  w^.bf := EH;
                  RotateLeft(x);
```

```
          rootᴬᴬ.left := x;
          RotateRight(root);
        end;
      end;
      taller := FALSE;
    end; {LeftBalance}

{------------------------------------------------------------------------}
    procedure RightBalance;
      var
        x, w: nodeHndl;
      begin
        x := rootᴬᴬ.right;
        case xᴬᴬ.bf of
          RH:
            begin
              rootᴬᴬ.bf := EH;
              xᴬᴬ.bf := EH;
              RotateLeft(root);
            end;
          EH:
            WriteLn('Error');
          LH:
            begin
              w := xᴬᴬ.left;
              case wᴬᴬ.bf of
                EH:
                  begin
                    rootᴬᴬ.bf := EH;
                    xᴬᴬ.bf := EH;
                  end;
                LH:
                  begin
                    rootᴬᴬ.bf := EH;
                    xᴬᴬ.bf := RH;
                  end;
                RH:
                  begin
                    rootᴬᴬ.bf := LH;
                    xᴬᴬ.bf := EH;
                  end;
              end;
              wᴬᴬ.bf := EH;
              RotateRight(x);
              rootᴬᴬ.right := x;
              RotateLeft(root);
            end;
        end;
        taller := FALSE;
      end; {RightBalance}

{------------------------------------------------------------------------}
  begin {Insert}
    if root = nil then
      begin
        root := newnode;
        rootᴬᴬ.left := nil;
        rootᴬᴬ.right := nil;
        rootᴬᴬ.bf := EH;
        taller := TRUE;
      end
    else if newnodeᴬᴬ.key = rootᴬᴬ.key then
      WriteLn('Duplicate entry')
    else if (newnodeᴬᴬ.key < rootᴬᴬ.key) or ((newnodeᴬᴬ.count > rootᴬᴬ.count) and (mode = 2)) then
      begin
        InsertNode(rootᴬᴬ.left, newnode, mode, taller_subtree);
        if taller_subtree then
```

```
     case root^^.bf of
      LH:
       LeftBalance;
      EH:
       begin
        root^^.bf := LH;
             taller := TRUE;
            end;
           RH:
            begin
             root^^.bf := EH;
             taller := FALSE;
            end;
          end
         else
          taller := FALSE;
        end
       else
        begin
         InsertNode(root^^.right, newnode, mode, taller_subtree);
         if taller_subtree then
          case root^^.bf of
           LH:
            begin
             root^^.bf := EH;
             taller := FALSE;
            end;
           EH:
            begin
             root^^.bf := RH;
             taller := TRUE;
            end;
           RH:
            RightBalance;
          end
         else
          taller := FALSE;
        end;
      end; {Insert}

{---------------------------------------------------------------------}
{---------------------------------------------------------------------}
   procedure DeleteNode (var root: nodeHndl;
            target: key_type;
            mode, count: Integer;
            var shorter: BOOLEAN);
   var
     shorter_subtree: BOOLEAN;

{---------------------------------------------------------------------}
   procedure LeftBalance;
    var
     x, w: nodeHndl;
   begin
    x := root^^.left;
    case x^^.bf of
     EH:
      begin
       root^^.bf := LH;
       x^^.bf := RH;
       RotateRight(root);
       shorter := FALSE;
      end;
     LH:
      begin
       root^^.bf := EH;
       x^^.bf := EH;
```

```
        RotateRight(root);
        shorter := TRUE;
       end;
      RH:
       begin
        w := x^^.right;
        case w^^.bf of
          EH:
           begin
            root^^.bf := EH;
            x^^.bf := EH;
           end;
          RH:
           begin
            root^^.bf := EH;
            x^^.bf := LH;
           end;
          LH:
           begin
            root^^.bf := RH;
            x^^.bf := EH;
           end;
        end;
        w^^.bf := EH;
        RotateLeft(x);
        root^^.left := x;
        RotateRight(root);
        shorter := TRUE;
       end;
    end; {Case}
  end; {LeftBalance}

{--------------------------------------------------------------------------} procedure RightBalance;
   var
    x, w: nodeHndl;
  begin
   x := root^^.right;
   case x^^.bf of
     EH:
      begin
       root^^.bf := RH;
       x^^.bf := LH;
       RotateLeft(root);
       shorter := FALSE;
      end;
     RH:
      begin
       root^^.bf := EH;
       x^^.bf := EH;
       RotateLeft(root);
       shorter := TRUE;
      end;
     LH:
      begin
       w := x^^.left;
       case w^^.bf of
         EH:
          begin
           root^^.bf := EH;
           x^^.bf := EH;
          end;
         LH:
          begin
           root^^.bf := EH;
           x^^.bf := RH;
          end;
```

```
      RH:
        begin
          root^^.bf := LH;
          x^^.bf := EH;
        end;
      end;
      w^^.bf := EH;
      RotateRight(x);
      root^^.right := x;
      RotateLeft(root);
      shorter := TRUE;
    end;
  end; {Case}
end; {RightBalance}

{-------------------------------------------------------------------------} procedure OneChild;
  var
    temp, p: nodeHndl;
  begin
    shorter := TRUE;
    if (root^^.left = nil) and (root^^.right = nil) then
      begin
{*      DisposHandle(HANDLE(root));*}
        root := nil;
      end
    else if root^^.left = nil then
      begin
{*      temp := root;*}
        root := root^^.right;
{*      DisposHandle(HANDLE(temp));*}
      end
    else if root^^.right = nil then
      begin
{*      temp := root;*}
        root := root^^.left;
{*      DisposHandle(HANDLE(temp));*}
      end
    else
      begin
        p := root^^.left;
        while p^^.right <> nil do
          p := p^^.right;
        root^^.key := p^^.key;
        DeleteNode(root^^.left, root^^.key, mode, count, shorter_subtree);
        if shorter_subtree then
          case root^^.bf of
            LH:
              begin
                root^^.bf := EH;
                shorter := TRUE;
              end;
            EH:
              begin
                root^^.bf := RH;
                shorter := FALSE;
              end;
            RH:
              RightBalance;
          end
        else
          shorter := FALSE;
      end
  end; {OneChild}

{-------------------------------------------------------------------------} begin {Delete}
```

```
    if root = nil then
      begin
        WriteLn('Target not in AVL tree');
        shorter := FALSE;
      end
    else if target = root^^.key then
      begin
        OneChild;
      end
    else if (target < root^^.key) or ((count > root^^.count) and (mode = 2)) then
      begin
        DeleteNode(root^^.left, target, mode, count, shorter_subtree);
        if shorter_subtree then
          case root^^.bf of
            LH:
              begin
                root^^.bf := EH;
                shorter := TRUE;
              end;
            EH:
              begin
                root^^.bf := RH;
                shorter := FALSE;
              end;
            RH:
              RightBalance;
          end
        else
          shorter := FALSE;
      end
    else
      begin
        DeleteNode(root^^.right, target, mode, count, shorter_subtree);

if shorter_subtree then
          case root^^.bf of
            LH:
              LeftBalance;
            EH:
              begin
                root^^.bf := LH;
                shorter := FALSE;
              end;
            RH:
              begin
                root^^.bf := EH;
                shorter := TRUE;
              end;
          end
        else
          shorter := FALSE;
      end;
  end; {Delete}

{-------------------------------------------------------------------------}
{* NumberNodes(p, nodeNumber);*}
procedure NumberNodes (p: nodeHndl;
        var nodeNumber: Integer);
  begin
    if p <> nil then
      begin
        NumberNodes(p^^.left, nodeNumber);
        nodeNumber := nodeNumber + 1;
        p^^.Count := nodeNumber;
        NumberNodes(p^^.right, nodeNumber);
      end;
  end; {InOrder}
```

```
{----------------------------------------------------------------------}
  function FindFirst (p: nodeHndl): nodeHndl;
   var
     temp: nodeHndl;
  begin
   if p = nil then
     FindFirst := nil
   else
     begin
       temp := p;
       while temp^.left <> nil do
         temp := temp^.left;
       FindFirst := temp;
     end;
  end; {FindFirst}

{----------------------------------------------------------------------}
  procedure ChangeOrder1to2 (var p1: nodeHndl);
   var
     p2, newnode: nodeHndl;
     s2: phrase_type;
     shorter, taller: Boolean;
  begin p2 := nil;
   while p1 <> nil do
    begin
      newnode := FindFirst(p1);
      s2 := newnode^.key;
      DeleteNode(p1, s2, 1, 0, shorter);
      InsertNode(p2, newnode, 2, taller);
    end;
   p1 := p2;
  end; {ChangeOrder1to2}

{----------------------------------------------------------------------}
  procedure ChangeOrder2to3 (var p1: nodeHndl);
   var
     p2, newnode: nodeHndl;
     s2, s3, s4: phrase_type;
     shorter, taller: Boolean;
     Count: Integer;
     str: str255;
  begin
   p2 := nil;
   while p1 <> nil do
     begin
       newnode := FindFirst(p1);
       s2 := newnode^.key;
       count := newnode^.count;
       DeleteNode(p1, s2, 2, count, shorter);
       str := s2;
       s3 := next(str);
       s4 := next(str);
{*     if NumWords > 2 then*}
       if str <> '' then
         begin
           s3 := Concat(s4, ' ', s3);
           s4 := next(str);
         end;
       s2 := Concat(s4, ' ', s3);
       newnode^.key := s2;
       InsertNode(p2, newnode, 3, taller);
     end;
   p1 := p2;
  end; {ChangeOrder2to3}
```

```
{--------------------------------------------------------------------------}
  procedure FindNode (root: nodeHndl;
           var newnode: nodeHndl;
           target:  key_type);
 begin {FindNode}
  newnode := nil;
  while (newnode = nil) and (root <> nil) do
    begin
     if target = root^^.key then
       newnode := root
     else if target < root^^.key then
       root := root^^.left
     else
       root := root^^.right;
    end;
 end; {FindNode}

{--------------------------------------------------------------------------}
  procedure FindNumberedNode (root: nodeHndl;
           var newnode: nodeHndl;
           NoneNumber: Integer);
 begin {FindNumberedNode}
  newnode := nil;
  while (newnode = nil) and (root <> nil) do
    begin
     if NoneNumber = root^^.count then
       newnode := root
     else if NoneNumber < root^^.count then
       root := root^^.left
     else
       root := root^^.right;
    end;
 end; {FindNumberedNode}

{--------------------------------------------------------------------------}
  procedure IncrementNode (var root: nodeHndl;
           str: key_type);
   var
     newnode: nodeHndl;
     s2: phrase_type;
     st1, st2: str255;
     Size: Integer;
  begin
    FindNode(root, newnode, str);
    if newnode <> nil then
     newnode^^.count := newnode^^.count + 1;
  end; {IncrementNode}

{--------------------------------------------------------------------------}
  procedure InitTagWord_list (var WordsTag: TagWord_list;
           Range: Integer);
   var
    i: Integer;
  begin
   for i := -Range - 2 to Range + 2 do
     WordsTag[i] := 0;
  end; {InitTagWord_list}

{--------------------------------------------------------------------------}
  procedure ShiftTagWord_list (var WordsTag: TagWord_list;
           Range: Integer);
   const
    EntrySize = SIZEOF(LongInt) * 2;
   var
    i: Integer;
    size: LongInt;
  begin
```

```
 size := EntrySize * Range;
 BlockMove(PTR(@WordsTag[-Range + 1]), PTR(@WordsTag[-Range]), size);
 WordsTag[Range] := 0;
end; {ShiftTagWord_list}
```

{------------------------------------------------------------------}
```
procedure InitTaggedWord_array (var TaggedWords: TagWordHndl;
          NumberOfNodes: Integer);
  var
   i, j: Integer;
 begin
  for i := 1 to NumberOfNodes do
   for j := 1 to NumberOfNodes do
    TaggedWords^^[i, j] := 0;
 end; {InitTaggedWord_array}
```

{------------------------------------------------------------------}
```
 procedure InitWordList (var Words: Word_list;
           Range: Integer);
  var
   i: Integer;
 begin
  for i := -Range - 2 to Range + 2 do
   Words[i] := '';
 end; {InitWordList}
```

{------------------------------------------------------------------}
```
 procedure ShiftWords (var Words: Word_list;
           str: word_type;
           Range: Integer);
  const
   EntrySize = SIZEOF(word_type) * 2;
  var
   i: Integer;
   size: LongInt;
 begin
  size := EntrySize * Range;
  BlockMove(PTR(@Words[-Range + 1]), PTR(@Words[-Range]), size);
  Words[Range] := str;
 end; {ShiftWords}
```

{------------------------------------------------------------------}
```
 procedure InitCoWord_array (var CoWords: CoWordHndl;
           NumberOfNodes: Integer);
  var
   i, j: Integer;
 begin
  for i := 1 to NumberOfNodes do
   for j := 1 to NumberOfNodes do
    CoWords^^[i, j] := 0;
 end; {InitCoWord_array}
```

{------------------------------------------------------------------}
```
 function NonTrivial1 (var TrivialRoot: nodeHndl;
           sTemp: str255): Boolean;
  var
   i: Integer;
   flag: Boolean;
   newnode: nodeHndl;
 begin
  flag := TRUE;
  if sTemp[1] < CHR(65) then
   flag := FALSE;
  if Length(sTemp) <= 1 then
   flag := FALSE;
  if flag = TRUE then
   begin
```

```
      FindNode(TrivialRoot, newnode, sTemp);
      if newnode <> nil then
        flag := FALSE;
    end;
  NonTrivial1 := flag;
end; {NonTrivial}

{------------------------------------------------------------------------}
function NonTrivial2 (sTemp: str255): Boolean;
  var
    flag: Boolean;
  begin
    flag := TRUE;
    if sTemp[1] < CHR(65) then
      flag := FALSE;
    if Length(sTemp) <= 1 then
      flag := FALSE;
    NonTrivial2 := flag;
  end; {NonTrivial}

{------------------------------------------------------------------------}
procedure IncrementArray1 (var CoWords: CoWordHndl;
            var root: nodeHndl;
            var Words: Word_list;
            row, NumWords, Range: Integer);
  var
    i: Integer;
    a1: Integer;
    column: Integer;
    newnode: nodeHndl;
  begin
    CoWords^^[row, row] := CoWords^^[row, row] + 1;
    a1 := -NumWords;
    for i := a1 - Range + 1 to a1 do
      begin
        FindNode(root, newnode, Words[i]);
        if newnode <> nil then
          begin
            column := newnode^^.count;
            if (row <> column) then
              CoWords^^[row, column] := CoWords^^[row, column] + 1;
          end;
      end; {for}
    for i := 1 to Range do
      begin
        FindNode(root, newnode, Words[i]);
        if newnode <> nil then
          begin
            column := newnode^^.count;
            if (row <> column) then
              CoWords^^[row, column] := CoWords^^[row, column] + 1;
          end;
      end; {for} for i := a1 - Range + 1 to a1 do
  begin
    FindNode(root, newnode, Concat(Words[i - 1], ' ', Words[i]));
    if newnode <> nil then
      begin
        column := newnode^^.count;
        if (row <> column) then
          CoWords^^[row, column] := CoWords^^[row, column] + 1;
      end;
  end; {for}
for i := 2 to Range + 1 do
  begin
    FindNode(root, newnode, Concat(Words[i - 1], ' ', Words[i]));
```

```
      if newnode <> nil then
        begin
          column := newnode^.count;
          if (row <> column) then
            CoWords^[row, column] := CoWords^[row, column] + 1;
        end;
    end; {for} for i := a1 - Range + 1 to a1 do
    begin
      FindNode(root, newnode, Concat(Words[i - 2], ' ', Words[i - 1], ' ', Words[i]));
      if newnode <> nil then
        begin
          column := newnode^.count;
          if (row <> column) then
            CoWords^[row, column] := CoWords^[row, column] + 1;
        end;
    end; {for}
  for i := 3 to Range + 2 do
    begin
      FindNode(root, newnode, Concat(Words[i - 2], ' ', Words[i - 1], ' ', Words[i]));
      if newnode <> nil then
        begin
          column := newnode^.count;
          if (row <> column) then
            CoWords^[row, column] := CoWords^[row, column] + 1;
        end;
    end; {for}
end; {IncrementArray1}

{--------------------------------------------------------------------------}
procedure IncrementArray2 (var CoWords: CoWordHndl;
                           var root: nodeHndl;
                           var Words: Word_list;
                           var WordsTag: TagWord_list;
                           row, NumWords, Range: Integer;
                           var TaggedWords: TagWordHndl);
var
  i: Integer;
  a1: Integer;
  column: Integer;
  newnode: nodeHndl;
begin
  CoWords^[row, row] := CoWords^[row, row] + 1;
  a1 := -NumWords;
  for i := a1 - Range + 1 to a1 do
    begin
      FindNode(root, newnode, Words[i]);
      if newnode <> nil then
        begin
          column := newnode^.count;
          if (row <> column) and (TaggedWords^[row, column] < WordsTag[i]) then
            begin
              TaggedWords^[row, column] := WordsTag[i];
              CoWords^[row, column] := CoWords^[row, column] + 1;
            end;
        end;
    end; {for}
  for i := 1 to Range do
    begin
      FindNode(root, newnode, Words[i]);
      if newnode <> nil then
        begin
          column := newnode^.count;
          if (row <> column) and (TaggedWords^[row, column] < WordsTag[i]) then
            begin
              TaggedWords^[row, column] := WordsTag[i];
```

```
          CoWords^^[row, column] := CoWords^^[row, column] + 1;
        end;
      end;
    end; {for} for i := a1 - Range + 1 to a1 do
    begin
      FindNode(root, newnode, Concat(Words[i - 1], ' ', Words[i]));
      if newnode <> nil then
        begin
          column := newnode^^.count;
          if (row <> column) and (TaggedWords^^[row, column] < WordsTag[i]) then
            begin
              TaggedWords^^[row, column] := WordsTag[i];
              CoWords^^[row, column] := CoWords^^[row, column] + 1;
            end;
        end;
    end; {for}
  for i := 2 to Range + 1 do
    begin
      FindNode(root, newnode, Concat(Words[i - 1], ' ', Words[i]));
      if newnode <> nil then
        begin
          column := newnode^^.count;
          if (row <> column) and (TaggedWords^^[row, column] < WordsTag[i]) then
            begin
              TaggedWords^^[row, column] := WordsTag[i];
              CoWords^^[row, column] := CoWords^^[row, column] + 1;
            end;
        end;
    end; {for} for i := a1 - Range + 1 to a1 do
    begin
      FindNode(root, newnode, Concat(Words[i - 2], ' ', Words[i - 1], ' ', Words[i]));
      if newnode <> nil then
        begin
          column := newnode^^.count;
          if (row <> column) and (TaggedWords^^[row, column] < WordsTag[i]) then
            begin
              TaggedWords^^[row, column] := WordsTag[i];
              CoWords^^[row, column] := CoWords^^[row, column] + 1;
            end;
        end;
    end; {for}
  for i := 3 to Range + 2 do
    begin
      FindNode(root, newnode, Concat(Words[i - 2], ' ', Words[i - 1], ' ', Words[i]));
      if newnode <> nil then
        begin
          column := newnode^^.count;
          if (row <> column) and (TaggedWords^^[row, column] < WordsTag[i]) then
            begin
              TaggedWords^^[row, column] := WordsTag[i];
              CoWords^^[row, column] := CoWords^^[row, column] + 1;
            end;
        end;
    end; {for}
end; {IncrementArray2}

{------------------------------------------------------------}
function MyFileFilter1 (paramBlock: ParmBlkPtr): Boolean;
  begin
{* if (paramBlock^.ioFlFndrInfo.fdCreator = 'EDIT') and (paramBlock^.ioFlFndrInfo.fdType = 'TEXT') then*}
    if (paramBlock^.ioFlFndrInfo.fdType = 'TEXT') then
      MyFileFilter1 := FALSE
    else
```

```
    MyFileFilter1 := TRUE;
  end; {MyFileFilter1}

{------------------------------------------------------------------}
  function PathNameFromDirID (DirID: longint;
            vRefNum: integer): str255;
    var
      Block: CInfoPBRec;
      directoryName, FullPathName: str255;
      err: OSErr;
  begin
    FullPathName := '';
    with block do
      begin
        ioNamePtr := @directoryName;
        ioDrParID := DirId;
      end;
    repeat
      with block do
        begin
          ioVRefNum := vRefNum;
          ioFDirIndex := -1;
          ioDrDirID := block.ioDrParID;
        end;
      err := PBGetCatInfo(@Block, FALSE);
      if err <> noErr then
        begin
          SysBeep(1);
          ReadLn;
        end;
      directoryName := concat(directoryName, ':');

fullPathName := concat(directoryName, fullPathName);
    until (block.ioDrDirID = 2);
    PathNameFromDirID := fullPathName;
  end;

{------------------------------------------------------------------}
  function do_getfile: str255;
    const
      SFSaveDisk = $214;
      CurDirStore = $398;
    type
      WordPtr = ^Integer;
      LongPtr = ^LongInt;
    var
      pt: Point;
      reply: SFReply;
      typeList: SFTypeList;
  begin
    SetPt(pt, 100, 100);
    SFGetFile(pt, '', @MyFileFilter1, -1, typeList, nil, reply);
    if (reply.good) then
      do_getfile := Concat(PathNameFromDirID(LongPtr(CurDirStore)^, -WordPtr(SFSaveDisk)^), reply.fName)
    else
      do_getfile := '';
  end; {do_getfile}

{------------------------------------------------------------------}
  function do_putfile (prompt: str255): str255;
    const
      SFSaveDisk = $214;
      CurDirStore = $398;
    type
      WordPtr = ^Integer;
      LongPtr = ^LongInt;
    var
```

```
    pt: Point;
    reply: SFReply;
  begin
    SetPt(pt, 100, 100);
    SFPutFile(pt, 'Save Output As...', prompt, nil, reply);
    if (reply.good) then
      do_putfile := Concat(PathNameFromDirID(LongPtr(CurDirStore)^, -WordPtr(SFSaveDisk)^), reply.fName)
    else
      do_putfile := '';
  end; {do_putfile}

{----------------------------------------------------------------------}
end. {unit} unit TextSlicer;
interface
  uses
    Tree;

procedure do_NonZoom (InputFileName, TrivialFileName, KeywordFileName, OutputFileName: str255;
          Frequency1, Frequency2, Frequency3, Range: Integer;
          DoubleCount: Boolean);
  procedure do_Zoom (InputFileName, TrivialFileName, KeywordFileName, OutputFileName: str255;
          Frequency1, Frequency2, Frequency3, Range: Integer;
          DoubleCount: Boolean);
  procedure do_FrequencySort (InputFileName, TrivialFileName, OutputFileName2, OutputFileName1, OutputFileNa
  str255;
          Action, Frequency1, Frequency2, Frequency3: Integer);

{----------------------------------------------------------------------}
implementation
  var
    NumWords: Integer;
    StartMem, MemLeft: LongInt;
    Start, Finish, SearchTime, Hours, Minutes, Seconds: LongInt;
    Start1, Finish1, waits: LongInt;
    theEvent: EventRecord;
    s1, str: str255;
    done, abort, shorter, taller: Boolean;
    infile, outfile: TEXT;
    root, TrivialRoot: nodeHndl;
    Keys, Chrs: LongInt;
    Count: Integer;
    word1, word2, word3: word_type;
    i, j: Integer;
    Words: Word_list;
    WordsTag: TagWord_list;
    TaggedWords: TagWordHndl;
    CoWords: CoWordHndl;
    newnode: nodeHndl;
    NumberOfNodes: Integer;
    EmptyShifts: Integer;
    Space: LongInt;
    MaxRAM: LongInt;
    lines: LongInt;
    tagCount: LongInt;
    countID: LongInt;
    EventReceived: Boolean;

infile2: integer;
    TotalCount: LongInt;
    EndOfLine, EndOfFile, justRead: Boolean;
    buffer: textBuffer;
    first, last, s: Integer;

r: Rect;
    err, err1: OSErr;
    fndrInfo: FInfo;
```

```
  volRefNum: Integer;
  volName: Str255;
{•  DecTemp, TimeStr: DecStr;•}
{•  f: DecForm;•}
  myDateForm: DateForm;
  NumSecs: LongInt;
  Date, Time: str255;
{---------------------------------------------------------------}
{---------------------------------------------------------------}
  function TypeOfChar (ch: char): Integer;
    const
      CR = chr(13);
  begin
    case ch of
      CR:
        TypeOfChar := 1;
      'A'..'Z', 'a'..'z', '0'..'9', '-':
        TypeOfChar := 2;
      otherwise
        TypeOfChar := 0;
    end; {case}
  end; {TypeOfChar}

{---------------------------------------------------------------}
  function NextWord (var buffer: TextBuffer;
            var first, last: Integer;
            var EndOfLine: Boolean): str255;
    var
      str: str255;
  begin
    EndOfLine := FALSE;
    str := '';
    while (TypeOfChar(buffer[first]) = 0) and (first <= last) do
      begin
        first := first + 1;
      end;
{•  if (TypeOfChar(buffer[first]) = 1) then•}
{•  begin•}
{•    EndOfLine := TRUE;•}
{•    first := first + 1;•}
{•  end;•}
    while (TypeOfChar(buffer[first]) = 2) and (first <= last) and not EndOfLine do
      begin
        str := Concat(str, buffer[first]);
        first := first + 1;
      end;
    while (TypeOfChar(buffer[first]) = 0) and (first <= last) do
      begin
        first := first + 1;
      end;
    if (TypeOfChar(buffer[first]) = 1) and (first <= last) then
      begin
        EndOfLine := TRUE;
        first := first + 1;
      end;
    NextWord := str;
  end; {NextWord}

{---------------------------------------------------------------} procedure NextLine (var buffer: TextBuffer;
            var first, last: Integer;
            var EndOfLine: Boolean);
    var
      str: str255;
  begin
    EndOfLine := FALSE;
```

```pascal
    while (TypeOfChar(buffer[first]) <> 1) and (first <= last) do
      begin
        first := first + 1;
      end;
    if (TypeOfChar(buffer[first]) = 1) then
      begin
        EndOfLine := TRUE;
        first := first + 1;
      end;
  end; {NextLine}

{---------------------------------------------------------------------------}
  procedure ReadBuffer (var infile, first, last: integer;
           var buffer: TextBuffer;
           var EndOfFile: Boolean;
           var TotalCount: LongInt);
    var
      err, err1: OSErr;
      count1, count2: LongInt;
  begin
    count1 := TextBufferSize - first + 1;
    count2 := count1;
    err := FSRead(infile, count2, @buffer[first]);
    if (err = noErr) or (err = eofErr) then
      begin
        if (count1 = count2) and not (err = eofErr) then
          begin
            last := first + count2 - 1;
          end {if count = size}
        else
          begin
            EndOfFile := TRUE;
            last := first + count2 - 1;
          end; {if count = size}
      end {if err=noErr}
    else
      begin
        err1 := FSClose(infile);
        HaltOSError('FSRead error', err, '', '');
      end; {if err<>noErr}
    TotalCount := TotalCount + count2;
  end; {ReadBuffer}

{---------------------------------------------------------------------------}
  procedure AddOrIncrement (var root: nodeHndl;
           str: key_type);
    var
      newnode: nodeHndl;
      st1, st2, st3: str255;
      Size: Integer;
      err: OSErr;
  begin
    FindNode(root, newnode, str);
    if newnode <> nil then
      newnode^^.count := newnode^^.count + 1
    else
      begin
        Size := EmptySize + (length(str) + 2) div 2 * 2;
        newnode := nodeHndl(NewHandle(Size));
        err := MemError;
        MemLeft := FreeMem;
        if (err <> noErr) or (MemLeft < 4096) then
          begin
            NumToString(Keys, st1);
            NumToString(Chrs, st2);
            st1 := Concat('Keys = ', st1);
            st2 := Concat('Chrs = ', st2);
```

```
        finish := TickCount;
        SearchTime := Round((finish - start - waits) / 60);
        NumToString(Chrs, st3);
        st2 := Concat(st2, ' Time = ', st3, ' secs');
        HaltOSError('Out Of Memory', err, st1, st2);
       end;
     Keys := Keys + 1;
     newnode^^.count := 1;
     newnode^^.key := str;
     InsertNode(root, newnode, 1, taller);
    end;
 end; {AddOrIncrement}

{-----------------------------------------------------------------------}
 procedure AddNode (var root: nodeHndl;
         str: key_type);
  var
   newnode: nodeHndl;
   st1, st2: str255;
   Size: Integer;
   err: OSErr;
 begin
  FindNode(root, newnode, str);
  if newnode = nil then
{•  newnode^^.count := newnode^^.count + 1•}
{•  else•}
   begin
    Size := EmptySize + (length(str) + 2) div 2 * 2;
    newnode := nodeHndl(NewHandle(Size));
    err := MemError;
    MemLeft := FreeMem;
    if (err <> noErr) or (MemLeft < 4096) then
     begin
      NumToString(Keys, st1);
      NumToString(Chrs, st2);
      st1 := Concat('Keys = ', st1);
      st2 := Concat('Chrs = ', st2);
      HaltOSError('Out Of Memory', err, st1, st2);
     end;
    Keys := Keys + 1;
    newnode^^.count := 0;
    newnode^^.key := str;
    InsertNode(root, newnode, 1, taller);
   end;
 end; {AddNode}

{•{-----------------------------------------------------------------------•}}
{• procedure LoadSearchTree (var root: nodeHndl;•}
{•        FileName: str255);•}
{•   var•}
{•    infile: TEXT;•}
{•    s1, s2, s3: word_type;•}
{•    str, s4: str255;•}
{• begin•}
{•  Reset(infile, FileName);•}
{•  while not Eof(infile) do•}
{•   begin•}
{•    ReadLn(infile, str);•}
{•    s1 := next(str);•}
{•    if s1 <> '' then•}
{•    begin•}
{•     if str = '' then•}
{•      s4 := s1•}
{•     else•}
{•      begin•}
{•       s2 := next(str);•}
{•       if str = '' then•}
```

```
{•       s4 := Concat(s1, ' ', s2)•}
{•     else•}
{•       s4 := Concat(s1, ' ', s2, ' ', next(str));•}
{•     end;•}
{•     UprString(s4, FALSE);•}
{•     AddNode(root, s4);•}
{•   end;•}
{•   end; {while•]}
{•   Close(infile);•}
{• end; {LoadSearchTree•]}
{••}
{--------------------------------------------------------------------------}
  procedure LoadSearchTree (var root: nodeHndl;
           FileName: str255);
  var
    err, err1: OSErr;
    infile: integer;
    fndrInfo: FInfo;
    TotalCount: LongInt;
    EndOfLine, EndOfFile: Boolean;
    done: Boolean;
    buffer: textBuffer;
    first, last, s: Integer;

s1, s2, s3: word_type;
    str, s4: str255;
  begin
    err := GetFInfo(FileName, 0, fndrInfo);
    if err <> noErr then
      HaltOSError('Invalid file error', err, '', '');
    err := FSOpen(FileName, 0, infile);
    if err <> noErr then
      HaltOSError('FSOpen error', err, '', '');

TotalCount := 0;
    EndOfFile := FALSE;
    first := 1;
    ReadBuffer(infile, first, last, buffer, EndOfFile, TotalCount);
    done := FALSE;
    while not done do
      begin
        s1 := NextWord(buffer, first, last, EndOfLine);
        if s1 <> '' then
          begin
            if EndOfLine then
              str := s1
            else
              begin
                s2 := NextWord(buffer, first, last, EndOfLine);
                if s2 <> '' then
                  begin
                    if EndOfLine then
                      str := Concat(s1, ' ', s2)
                    else
                      str := Concat(s1, ' ', s2, ' ', NextWord(buffer, first, last, EndOfLine));
                  end;
              end;
            UprString(str, FALSE);
            AddNode(root, str);
          end;

if (first > TextBufferLimit) and not EndOfFile then
          begin
            s := TextBufferSize - first + 1;
            BlockMove(PTR(@buffer[first]), PTR(@buffer[1]), s);
            first := 1;
            s := s + 1;
```

```
          ReadBuffer(infile2, s, last, buffer, EndOfFile, Chrs);
        end;
      if (first >= last) and EndOfFile then
        done := TRUE;
    end; {while}
  err := FSClose(infile);
  if err <> noErr then
    HaltOSError('FSClose error', err, '', '');
end; {LoadSearchTree}

{------------------------------------------------------------------------}
procedure Visit (p: nodeHndl;
          mode, ToFile, Frequency1, Frequency2, Frequency3: Integer;
          var nodes: LongInt);
var
  str: str255;
  s1, s2, s3: phrase_type;
  i: Integer;
  out: Boolean;
begin
  out := FALSE;
  str := p^^.key;
  s1 := next(str);
  s2 := next(str);
  if s2 = '' then
    begin
      i := 1;
    end
  else
    begin
      s3 := next(str);
      if s3 = '' then
        i := 2
      else
        i := 3;
    end;
  if (mode = 3) then
    begin
      case i of
        1:
          begin
            str := s1;
            if (p^^.count >= Frequency1) then
              out := TRUE;
          end;
        2:
          begin
            str := Concat(s2, ' ', s1);
            if (p^^.count >= Frequency2) then
              out := TRUE;
          end;
        3:
          begin
            str := Concat(s3, ' ', s2, ' ', s1);
            if (p^^.count >= Frequency3) then
              out := TRUE;
          end;
      end; {case}
    end
  else
    begin
      str := p^^.key;
      case i of
        1:
          begin
            if (p^^.count >= Frequency1) then
              out := TRUE;
```

```
          end;
        2:
          begin
            if (p^^.count >= Frequency2) then
              out := TRUE;
          end;
        3:
          begin
            if (p^^.count >= Frequency3) then
              out := TRUE;
          end;
      end; {case}
    end;

if out then
      begin
        if ToFile = 1 then
          WriteLn(outfile, p^^.count : 4, ' ', str)
        else
          WriteLn(p^^.count : 4, ' ', str);
        nodes := nodes + 1;
      end;
  end; {Visit}

{-----------------------------------------------------------------------}
  procedure InOrder (p: nodeHndl;
          mode, ToFile, Frequency1, Frequency2, Frequency3: Integer;
          var nodes: LongInt);
  begin
    if p <> nil then
      begin
        InOrder(p^^.left, mode, ToFile, Frequency1, Frequency2, Frequency3, nodes);
        Visit(p, mode, ToFile, Frequency1, Frequency2, Frequency3, nodes);
        InOrder(p^^.right, mode, ToFile, Frequency1, Frequency2, Frequency3, nodes);
      end;
  end; {InOrder}

{-----------------------------------------------------------------------}
  procedure IncrementZoomNode (var root: nodeHndl;
          var WordsTag: TagWord_list;
          NumWords, Range: Integer;
          DoubleCount: Boolean);
    var
      i: Integer;
      a1: Integer;
      thenode: nodeHndl;
      st1, st2, st3: str255;
      Size: Integer;
      str: key_type;
  begin
    a1 := -NumWords;
    for i := a1 - Range + 1 to a1 do
      begin
        str := Words[i];
        if NonTrivial1(TrivialRoot, Words[i]) then
          begin
            FindNode(root, thenode, str);
            if (thenode <> nil) then
              begin
                if DoubleCount or (thenode^^.tag < WordsTag[i]) then
                  begin
                    thenode^^.count := thenode^^.count + 1;
                    thenode^^.tag := WordsTag[i];
                  end;
              end
            else
              begin
```

```
            Size := EmptySize + (length(str) + 2) div 2 * 2;
            thenode := nodeHndl(NewHandle(Size));
            err := MemError;
            MemLeft := FreeMem;
            if (err <> noErr) or (MemLeft < 4096) then
              begin
                NumToString(Keys, st1);
                NumToString(Chrs, st2);
                st1 := Concat('Keys = ', st1);
                st2 := Concat('Chrs = ', st2);
                finish := TickCount;
                SearchTime := Round((finish - start - waits) / 60);
                NumToString(Chrs, st3);
                st2 := Concat(st2, ' Time = ', st3, ' secs');
                HaltOSError('Out Of Memory', err, st1, st2);
              end;
            Keys := Keys + 1;
            thenode^.count := 1;
            thenode^.tag := WordsTag[i];
            thenode^.key := str;
            InsertNode(root, thenode, 1, taller);
          end; {exists}
      end; {if NonTrivial}
  end; {for}
for i := 1 to Range do
  begin
    str := Words[i];
    if NonTrivial1(TrivialRoot, Words[i]) then
      begin
        FindNode(root, thenode, str);
        if (thenode <> nil) then
          begin
            if DoubleCount or (thenode^.tag < WordsTag[i]) then
              begin
                thenode^.count := thenode^.count + 1;
                thenode^.tag := WordsTag[i];
              end;
          end
        else
          begin
            Size := EmptySize + (length(str) + 2) div 2 * 2;
            thenode := nodeHndl(NewHandle(Size));
            err := MemError;
            MemLeft := FreeMem;
            if (err <> noErr) or (MemLeft < 4096) then
              begin
                NumToString(Keys, st1);
                NumToString(Chrs, st2);
                st1 := Concat('Keys = ', st1);
                st2 := Concat('Chrs = ', st2);
                finish := TickCount;
                SearchTime := Round((finish - start - waits) / 60);
                NumToString(Chrs, st3);
                st2 := Concat(st2, ' Time = ', st3, ' secs');
                HaltOSError('Out Of Memory', err, st1, st2);
              end;
            Keys := Keys + 1;
            thenode^.count := 1;
            thenode^.tag := WordsTag[i];
            thenode^.key := str;
            InsertNode(root, thenode, 1, taller);
          end; {exists}
      end; {if NonTrivial}
  end; {for} for i := a1 - Range + 1 to a1 do
  begin
```

```
          str := Concat(Words[i - 1], ' ', Words[i]);
          if NonTrivial1(TrivialRoot, Words[i - 1]) and NonTrivial1(TrivialRoot, Words[i]) then
            begin
              FindNode(root, thenode, str);
              if (thenode <> nil) then
                begin
                  if DoubleCount or (thenode^^.tag < WordsTag[i]) then
                    begin
                      thenode^^.count := thenode^^.count + 1;
                      thenode^^.tag := WordsTag[i];
                    end;
                end
              else
                begin
                  Size := EmptySize + (length(str) + 2) div 2 * 2;
                  thenode := nodeHndl(NewHandle(Size));
                  err := MemError;
                  MemLeft := FreeMem;
                  if (err <> noErr) or (MemLeft < 4096) then
                    begin
                      NumToString(Keys, st1);
                      NumToString(Chrs, st2);
                      st1 := Concat('Keys = ', st1);
                      st2 := Concat('Chrs = ', st2);
                      finish := TickCount;
                      SearchTime := Round((finish - start - waits) / 60);
                      NumToString(Chrs, st3);
                      st2 := Concat(st2, ' Time = ', st3, ' secs');
                      HaltOSError('Out Of Memory', err, st1, st2);
                    end;
                  Keys := Keys + 1;
                  thenode^^.count := 1;
                  thenode^^.tag := WordsTag[i];
                  thenode^^.key := str;
                  InsertNode(root, thenode, 1, taller);
                end; {exists}
            end; {if NonTrivial}
        end; {for}
      for i := 2 to Range + 1 do
        begin
          str := Concat(Words[i - 1], ' ', Words[i]);
          if NonTrivial1(TrivialRoot, Words[i - 1]) and NonTrivial1(TrivialRoot, Words[i]) then
            begin
              FindNode(root, thenode, str);
              if (thenode <> nil) then
                begin
                  if DoubleCount or (thenode^^.tag < WordsTag[i]) then
                    begin
                      thenode^^.count := thenode^^.count + 1;
                      thenode^^.tag := WordsTag[i];
                    end;
                end
              else
                begin
                  Size := EmptySize + (length(str) + 2) div 2 * 2;
                  thenode := nodeHndl(NewHandle(Size));
                  err := MemError;
                  MemLeft := FreeMem;
                  if (err <> noErr) or (MemLeft < 4096) then
                    begin
                      NumToString(Keys, st1);
                      NumToString(Chrs, st2);
                      st1 := Concat('Keys = ', st1);
                      st2 := Concat('Chrs = ', st2);
                      finish := TickCount;
                      SearchTime := Round((finish - start - waits) / 60);
                      NumToString(Chrs, st3);
```

```
              st2 := Concat(st2, '  Time = ', st3, ' secs');
              HaltOSError('Out Of Memory', err, st1, st2);
            end;
          Keys := Keys + 1;
          thenode^^.count := 1;
          thenode^^.tag := WordsTag[i];
          thenode^^.key := str;
          InsertNode(root, thenode, 1, taller);
        end; {exists}
      end; {if NonTrivial}
    end; {for} for i := a1 - Range + 1 to a1 do
      begin
        str := Concat(Words[i - 2], ' ', Words[i - 1], ' ', Words[i]);
        if NonTrivial1(TrivialRoot, Words[i - 2]) and NonTrivial2(Words[i - 1]) and NonTrivial1(TrivialRoot, Words
then
          begin
            FindNode(root, thenode, str);
            if (thenode <> nil) then
              begin
                if DoubleCount or (thenode^^.tag < WordsTag[i]) then
                  begin
                    thenode^^.count := thenode^^.count + 1;
                    thenode^^.tag := WordsTag[i];
                  end;
              end
            else
              begin
                Size := EmptySize + (length(str) + 2) div 2 * 2;
                thenode := nodeHndl(NewHandle(Size));
                err := MemError;
                MemLeft := FreeMem;
                if (err <> noErr) or (MemLeft < 4096) then
                  begin
                    NumToString(Keys, st1);
                    NumToString(Chrs, st2);
                    st1 := Concat('Keys = ', st1);
                    st2 := Concat('Chrs = ', st2);
                    finish := TickCount;
                    SearchTime := Round((finish - start - waits) / 60);
                    NumToString(Chrs, st3);
                    st2 := Concat(st2, '  Time = ', st3, ' secs');
                    HaltOSError('Out Of Memory', err, st1, st2);
                  end;
                Keys := Keys + 1;
                thenode^^.count := 1;
                thenode^^.tag := WordsTag[i];
                thenode^^.key := str;
                InsertNode(root, thenode, 1, taller);
              end; {exists}
          end; {if NonTrivial}
      end; {for}
    for i := 3 to Range + 2 do
      begin
        str := Concat(Words[i - 2], ' ', Words[i - 1], ' ', Words[i]);
        if NonTrivial1(TrivialRoot, Words[i - 2]) and NonTrivial2(Words[i - 1]) and NonTrivial1(TrivialRoot, Words
then
          begin
            FindNode(root, thenode, str);
            if (thenode <> nil) then
              begin
                if DoubleCount or (thenode^^.tag < WordsTag[i]) then
                  begin
                    thenode^^.count := thenode^^.count + 1;
                    thenode^^.tag := WordsTag[i];
                  end;
```

```
              end
            else
              begin
                Size := EmptySize + (length(str) + 2) div 2 * 2;
                thenode := nodeHndl(NewHandle(Size));
                err := MemError;
                MemLeft := FreeMem;
                if (err <> noErr) or (MemLeft < 4096) then
                  begin
                    NumToString(Keys, st1);
                    NumToString(Chrs, st2);
                    st1 := Concat('Keys = ', st1);
                    st2 := Concat('Chrs = ', st2);
                    finish := TickCount;
                    SearchTime := Round((finish - start - waits) / 60);
                    NumToString(Chrs, st3);
                    st2 := Concat(st2, ' Time = ', st3, ' secs');
                    HaltOSError('Out Of Memory', err, st1, st2);
                  end;
                Keys := Keys + 1;
                thenode^^.count := 1;
                thenode^^.tag := WordsTag[i];
                thenode^^.key := str;
                InsertNode(root, thenode, 1, taller);
              end; {exists}
          end; {if NonTrivial}
      end; {for}
  end; {IncrementZoomNode}

{--------------------------------------------------------------------------------}
  procedure CheckPlurals (var p1: nodeHndl);
    var
{*    str: str255;*}
      l: Integer;
      p2, newnode, newnode2: nodeHndl;
      str, s2: phrase_type;
      shorter, taller, tag: Boolean;
  begin
    p2 := nil;
    while p1 <> nil do
      begin
        tag := FALSE;
        newnode := FindFirst(p1);
        str := newnode^^.key;
        DeleteNode(p1, str, 1, 0, shorter);
        l := length(str);
        if (str[l - 1] = 'E') and (str[l] = 'S') and not tag then
          begin
            s2 := Omit(str, l - 1, 2);
            FindNode(p2, newnode2, s2);
            if newnode2 <> nil then
              begin
                newnode2^^.count := newnode2^^.count + newnode^^.count;
                DisposHandle(HANDLE(newnode));
                tag := TRUE;
              end;
          end;
        if (str[l] = 'S') and not tag then
          begin
            s2 := Omit(str, l, 1);
            FindNode(p2, newnode2, s2);
            if newnode2 <> nil then
              begin
                newnode2^^.count := newnode2^^.count + newnode^^.count;
                DisposHandle(HANDLE(newnode));
                tag := TRUE;
              end;
```

```
      end;
    if not tag then
      begin
        InsertNode(p2, newnode, 1, tailer);
      end;

end;
  p1 := p2;
end; {CheckPlurals}

{------------------------------------------------------------------------------}
{* procedure Do_TextSlicer (InputFileName, TrivialFileName, SearchFileName, OutputFileName1, OutputFileName2,
  OutputFileName3: str255;*}
{*      Action, Frequency1, Frequency2, Frequency3, Range: Integer);*}
 procedure do_NonZoom (InputFileName, TrivialFileName, KeywordFileName, OutputFileName: str255;
         Frequency1, Frequency2, Frequency3, Range: Integer;
         DoubleCount: Boolean);
    var
      i, j: Integer;
      Ci, Cj, Cij, inc: Real;
    begin
      SetRect(r, 5, 40, 505, 340);
      SetTextRect(r);
      ShowText;
      CouldAlert(129);
      StartMem := FreeMem;

root := nil;
      Keys := 0;
      GetDateTime(NumSecs);
      IUDateString(NumSecs, LongDate, Date);
      IUTimeString(NumSecs, FALSE, Time);
      LoadSearchTree(root, KeywordFileName);
      NumberOfNodes := 0;
      NumberNodes(root, NumberOfNodes);
      Reset(infile, InputFileName);
      WriteLn('----------------------------------------------------------');
      WriteLn(version);
      WriteLn('Run : ', Date, '   ', Time);
      WriteLn('InputFileName: ', InputFileName);
      WriteLn('KeywordsFileName: ', KeywordFileName);
      WriteLn('OutputFileName: ', OutputFileName);
      WriteLn('Frequency Cutoff: N/A');
      if DoubleCount then
        WriteLn('Double Count Non Zoom ±', Range : 3)
      else
        WriteLn('Non Zoom ±', Range : 3);
      WriteLn;
      CoWords := CoWordHndl(NewHandle(SizeOf(CoWord_array)));
      InitCoWord_array(CoWords, NumberOfNodes);
      InitWordList(Words, Range + 3);
      if not DoubleCount then
        begin
          TaggedWords := TagWordHndl(NewHandle(SizeOf(TagWord_array)));
          InitTaggedWord_array(TaggedWords, NumberOfNodes);
          InitTagWord_list(WordsTag, Range + 3);
        end;
      Chrs := 0;
      countID := 0;
      done := FALSE;
      EmptyShifts := 0;
      waits := 0;
      start := TickCount;
      while not Eof(infile) and not done do
        begin
          ReadLn(infile, str);
          Chrs := Chrs + Length(str) + 1;
```

```
repeat
  s1 := next(str);
{*   s1 := NextWord(str);*}
  UprString(s1, FALSE);
  if (s1 <> '') or Eof(infile) then
    begin
      countID := countID + 1;
      ShiftWords(Words, s1, Range + 3);
      if not DoubleCount then
        begin
          ShiftTagWord_list(WordsTag, Range + 3);
          WordsTag[Range + 3] := countID;
        end;
      FindNode(root, newnode, Words[0]);
      if newnode <> nil then
        begin
          Count := newnode^.count;
          if DoubleCount then
            IncrementArray1(CoWords, root, Words, Count, 1, Range)
          else
            IncrementArray2(CoWords, root, Words, WordsTag, Count, 1, Range, TaggedWords)
        end;
      FindNode(root, newnode, Concat(Words[-1], ' ', Words[0]));
      if newnode <> nil then
        begin
          Count := newnode^.count;
          if DoubleCount then
            IncrementArray1(CoWords, root, Words, Count, 2, Range)
          else
            IncrementArray2(CoWords, root, Words, WordsTag, Count, 2, Range, TaggedWords)
        end;
      FindNode(root, newnode, Concat(Words[-2], ' ', Words[-1], ' ', Words[0]));
      if newnode <> nil then
        begin
          Count := newnode^.count;
          if DoubleCount then
            IncrementArray1(CoWords, root, Words, Count, 3, Range)
          else
            IncrementArray2(CoWords, root, Words, WordsTag, Count, 3, Range, TaggedWords)
        end;
    end;
  if Eof(infile) and (str = '') and (EmptyShifts < Range + 3) then
    begin
      str := ' ';
      EmptyShifts := EmptyShifts + 1;
    end;
until str = '';
EventReceived := WaitNextEvent(EveryEvent, theEvent, 0, nil);
case theEvent.what of
  NullEvent:
    begin
    end; {NullEvent}
  keyDown:
    begin
      Start1 := TickCount;
      MemLeft := FreeMem;
      WriteLn('RAM  = ', MemLeft);
      WriteLn('Keys = ', Keys);
      WriteLn('Chrs = ', Chrs);
      finish := TickCount;
      SearchTime := Round((finish - start - waits) / 60);
      Hours := SearchTime div 3600;
      Minutes := (SearchTime mod 3600) div 60;
      Seconds := SearchTime mod 60;
      Write('Time = ');
      if Hours > 0 then
        Write(Hours, ' hr ');
```

```
            if Minutes > 0 then
              Write(Minutes, ' min ');
            WriteLn(Seconds, ' sec ');
            Write('TERMINATE the search ?');
            SetCursor(arrow);
            ReadLn(str);
            SetCursor(GetCursor(watchCursor)^^);
            if (str[1] = 'Y') or (str[1] = 'y') then
              begin
                done := TRUE;
                WriteLn('Aborting...');
              end
            else
              begin
                done := FALSE;
                WriteLn('Working...');
              end;
            Finish1 := TickCount;
            waits := waits + Finish1 - Start1;
          end; {KeyDown}
         updateEvt:
           begin
             ShowText;
           end; {updateEvt}
         otherwise
           begin
{*           WriteLn('E=', theEvent.what);*}
           end; {otherwise}
        end; {case}
      end; {while}
  Close(infile);
  finish := TickCount;
  SearchTime := Round((finish - start - waits) / 60);
  Hours := SearchTime div 3600;
  Minutes := (SearchTime mod 3600) div 60;
  Seconds := SearchTime mod 60;

if not done then
    begin
      if OutputFileName <> '' then
        begin
          Rewrite(outfile, OutputFileName);
          WriteLn(outfile, version);
          WriteLn(outfile, 'Run : ', Date, '   ', Time);
          WriteLn(outfile, 'InputFileName: ', InputFileName);
          WriteLn(outfile, 'KeywordsFileName: ', KeywordFileName);
          WriteLn(outfile, 'OutputFileName: ', OutputFileName);
          WriteLn(outfile, 'Frequency Cutoff: N/A');
          if DoubleCount then
            WriteLn(outfile, 'Double Count Non Zoom ±', Range : 3)
          else
            WriteLn(outfile, 'Non Zoom ±', Range : 3);
          WriteLn(outfile);
          Write(outfile, 'Time = ');
      if Hours > 0 then
        Write(outfile, Hours, ' hr ');
      if Minutes > 0 then
        Write(outfile, Minutes, ' min ');
      WriteLn(outfile, Seconds, ' sec ');
      WriteLn(outfile, 'Chrs = ', Chrs);

lines := 0;
      InOrder(root, 1, 1, 1, 1, 1, lines);
      WriteLn(outfile, 'Lines = ', lines);
      WriteLn(outfile);
      WriteLn(outfile, 'Co - Occurrence Matrix ');
      for i := 0 to NumberOfNodes do
```

```
begin
  for j := 0 to NumberOfNodes do
    begin
      if i = 0 then
        begin
          if j = 0 then
            Write(outfile, 'r-c' : 4)
          else
            Write(outfile, j : 4);
        end
      else
        begin
          if j = 0 then
            Write(outfile, i : 4)
          else
            Write(outfile, CoWords^^[i, j] : 4);
        end;
    end;
  WriteLn(outfile);
end;
WriteLn(outfile);
WriteLn(outfile, 'Inclusion Index (Cij / Cj * 100)');
for i := 0 to NumberOfNodes do
  begin
    for j := 0 to NumberOfNodes do
      begin
        if i = 0 then
          begin
            if j = 0 then
              Write(outfile, 'r-c' : 4)
            else
              Write(outfile, j : 4);
          end
        else
          begin
            if j = 0 then
              Write(outfile, i : 4)
            else
              begin
                Ci := CoWords^^[i, i];
                Cj := CoWords^^[j, j];
                Cij := CoWords^^[i, j];
                inc := Cij / Cj * 100;
                if (i = j) then
                  Write(outfile, '    *')
                else if (inc = 0) then
                  Write(outfile, '    -')
                else
                  Write(outfile, inc : 4 : 0);
              end;
          end;
      end; {j}
    WriteLn(outfile);
  end; {i}
WriteLn(outfile);
WriteLn(outfile, 'E Index (Cij^2 / (Ci * Cj) * 100)');
for i := 0 to NumberOfNodes do
  begin
    for j := 0 to NumberOfNodes do
      begin
        If i = 0 then
          begin
            if j = 0 then
              Write(outfile, 'r-c' : 4)
            else
              Write(outfile, j : 4);
          end
```

```
            else
              begin
                if j = 0 then
                  Write(outfile, i : 4)
                else
                  begin
                    Ci := CoWords^^[i, i];
                    Cj := CoWords^^[j, j];
                    Cij := CoWords^^[i, j];
                    inc := Sqr(Cij) / (Ci * Cj) * 100;
                    if (i = j) then
                      Write(outfile, '    *')
                    else if (inc = 0) then
                      Write(outfile, '    -')
                    else
                      Write(outfile, inc : 4 : 0);
                  end;
              end;
          end;{j}
        WriteLn(outfile);
      end; {i}

Close(outfile);
      err := GetFInfo(OutputFileName, 0, fndrInfo);
      fndrInfo.fdCreator := MyFileCreator;
      fndrInfo.fdType := MyFileType;
      fndrInfo.fdFlags := 6;
      err := SetFInfo(OutputFileName, 0, fndrInfo);
      err := GetVol(@volName, volRefNum);
      err := FlushVol(nil, volRefNum);
    end; {OutputFileName2}

{*  lines := 0;*}
{*  InOrder(root, 1, 0, 1, 1, 1, lines);*}
{*  WriteLn('Lines = ', lines);*}
{*  WriteLn;*}
{*  for i := 0 to NumberOfNodes do*}
{*  begin*}
{*    for j := 0 to NumberOfNodes do*}
{*    begin*}
{*      if i = 0 then*}
{*      begin*}
{*        if j = 0 then*}
{*          Write('r-c' : 4)*}
{*        else*}
{*          Write(j : 4);*}
{*      end*}
{*      else*}
{*      begin*}
{*        if j = 0 then*}
{*          Write(i : 4)*}
{*        else*}
{*          Write(CoWords^^[i, j] : 4);*}
{*      end;*}
{*    end; {j*]}
{*    WriteLn;*}
{*  end; {i*]}

Write('Time = ');
    if Hours > 0 then
      Write(Hours, ' hr ');
    if Minutes > 0 then
      Write(Minutes, ' min ');
    WriteLn(Seconds, ' sec ');
    WriteLn('Total Lines = ', Keys);
    WriteLn('Chrs = ', Chrs);
    WriteLn('RAM  = ', StartMem - MemLeft, ' Bytes');
```

```
    end; {outputs}

DisposHandle(HANDLE(CoWords));
  DisposHandle(HANDLE(TaggedWords));
  Kill_tree(root);
  WriteLn;
  SetCursor(arrow);
  SysBeep(1);
  WriteLn('Press Return to Quit...');
  SetCursor(arrow);

done := FALSE;
  repeat
    EventReceived := WaitNextEvent(EveryEvent, theEvent, 0, nil);
    case theEvent.what of
      NullEvent:
        begin
        end; {NullEvent}
      keyDown:
        begin
          done := TRUE;
        end; {KeyDown}
      updateEvt:
        begin
          ShowText;
        end; {updateEvt}
      otherwise
        begin
{*        WriteLn('E=', theEvent.what);*}
        end; {otherwise}
    end; {case}
  until done;

HideAll;
end; {do_NonZoom}

{------------------------------------------------------------------------}
  procedure do_Zoom (InputFileName, TrivialFileName, KeywordFileName, OutputFileName: str255;
          Frequency1, Frequency2, Frequency3, Range: Integer;
          DoubleCount: Boolean);
  const
    MaxPerPass = 10;
    PerPass = 10;
  type
    nodesList = array[1..MaxPerPass] of nodeHndl;
    countList = array[1..MaxPerPass] of Integer;
  var
    i, j: Integer;
    ZoomRoot, newnode: nodesList;
    ZoomCount: countList;
begin
  SetRect(r, 5, 40, 505, 340);
  SetTextRect(r);
  ShowText;
  CouldAlert(129);
  StartMem := FreeMem;

MaxRAM := 0;
  Keys := 0;
  waits := 0;
  start := TickCount;
  TrivialRoot := nil;
  LoadSearchTree(TrivialRoot, TrivialFileName);
  Keys := 0;
  root := nil;
  LoadSearchTree(root, KeywordFileName);
  NumberOfNodes := 0;
```

```
NumberNodes(root, NumberOfNodes);
GetDateTime(NumSecs);
IUDateString(NumSecs, LongDate, Date);
IUTimeString(NumSecs, FALSE, Time);
Rewrite(outfile, OutputFileName);
WriteLn('--------------------------------------------------------------');
WriteLn(version);
WriteLn('Run : ', Date, '    ', Time);
WriteLn('InputFileName: ', InputFileName);
WriteLn('TrivialFileName: ', TrivialFileName);
WriteLn('KeywordsFileName: ', KeywordFileName);
WriteLn('OutputFileName: ', OutputFileName);
WriteLn('Frequency Cutoff: ', Frequency1, Frequency2, Frequency3);
if DoubleCount then
WriteLn('Double Count Zoom Range ', Range : 3)
else
WriteLn('Zoom Range ', Range : 3);
WriteLn;
WriteLn(outfile, version);
WriteLn(outfile, 'Run : ', Date, '    ', Time);
WriteLn(outfile, 'InputFileName: ', InputFileName);
WriteLn(outfile, 'TrivialFileName: ', TrivialFileName);
WriteLn(outfile, 'KeywordsFileName: ', KeywordFileName);
WriteLn(outfile, 'OutputFileName: ', OutputFileName);
WriteLn(outfile, 'Frequency Cutoff: ', Frequency1, Frequency2, Frequency3);
if DoubleCount then
  WriteLn(outfile, 'Double Count Zoom Range ', Range : 3)
else
  WriteLn(outfile, 'Zoom Range ', Range : 3);
WriteLn(outfile);
{*   Reset(infile, InputFileName);*}
err := GetFInfo(InputFileName, 0, fndrInfo);
if err <> noErr then
  HaltOSError('Invalid file error', err, '', '');
err := FSOpen(InputFileName, 0, infile2);
if err <> noErr then
  HaltOSError('FSOpen error', err, '', '');

i := 1;
while i <= NumberOfNodes do
  begin
    err := SetFPos(infile2, fsFromStart, 0);
    if err <> noErr then
      HaltOSError('SetFPos error', err, '', '');

InitWordList(Words, Range);
    InitTagWord_list(WordsTag, Range + 3);
    for j := 1 to PerPass do
      begin
        ZoomRoot[j] := nil;
        ZoomCount[j] := 0;
      end; {for j:=1 to PerPass}
    for j := 1 to PerPass do
      begin
        if (i + (j - 1) <= NumberOfNodes) then
          FindNumberedNode(root, newnode[j], i + (j - 1))
        else
          newnode[j] := nil;
      end; {for j:=1 to passes}
    Keys := 0;
    Chrs := 0;
    countID := 0;
    EmptyShifts := 0;

justRead := FALSE;
    TotalCount := 0;
    EndOfFile := FALSE;
```

```
             first := 1;
             ReadBuffer(infile2, first, last, buffer, EndOfFile, Chrs);
             done := FALSE;
             abort := FALSE;
             while not done and not abort do
               begin
{•           ReadLn(infile, str);•}
{•           Chrs := Chrs + Length(str) + 1;•}
             repeat
{•             s1 := next(str);•}
               s1 := NextWord(buffer, first, last, EndOfLine);
               UprString(s1, FALSE);

if (s1 <> '') or ((first >= last) and EndOfFile) then
                 begin
                   countID := countID + 1;
                   ShiftWords(Words, s1, Range + 3);
                   ShiftTagWord_list(WordsTag, Range + 3);
                   WordsTag[Range + 3] := countID;
                   for j := 1 to PerPass do
                     if newnode[j] <> nil then
                       begin
                         if newnode[j]^^.key = Words[0] then
                           begin
                             IncrementZoomNode(ZoomRoot[j], WordsTag, 1, Range, DoubleCount);
                             ZoomCount[j] := ZoomCount[j] + 1;
                           end
                         else if newnode[j]^^.key = Concat(Words[-1], ' ', Words[0]) then
                           begin
                             IncrementZoomNode(ZoomRoot[j], WordsTag, 2, Range, DoubleCount);
                             ZoomCount[j] := ZoomCount[j] + 1;
                           end
                         else if newnode[j]^^.key = Concat(Words[-2], ' ', Words[-1], ' ', Words[0]) then
                           begin
                             IncrementZoomNode(ZoomRoot[j], WordsTag, 3, Range, DoubleCount);
                             ZoomCount[j] := ZoomCount[j] + 1;
                           end;
                       end; {for j:=1 to PerPass}
                 end;{if (s1 <> '') or Eof(infile) then} if (first > TextBufferLimit) and not EndOfFile then
                   begin
                     s := TextBufferSize - first + 1;
                     BlockMove(PTR(@buffer[first]), PTR(@buffer[1]), s);
                     first := 1;
                     s := s + 1;
                     ReadBuffer(infile2, s, last, buffer, EndOfFile, Chrs);
                     justRead := TRUE;
                   end;
                 if (first >= last) and EndOfFile then
                   done := TRUE;
                 if (first >= last) and EndOfFile and (EmptyShifts < Range + 2) then
                   begin
                     done := FALSE;
{•                   str := ' ';•}
                     EmptyShifts := EmptyShifts + 1;
                   end;
               until done or justRead;

justRead := FALSE;
{•             WriteLn(Chrs);•}
               EventReceived := WaitNextEvent(EveryEvent, theEvent, 0, nil);
               case theEvent.what of
                 NullEvent:
                   begin
                   end; {NullEvent}
                 keyDown:
```

```
    begin
      Start1 := TickCount;
      MemLeft := FreeMem;
      WriteLn('RAM  = ', MemLeft);
      WriteLn('Keys = ', Keys);
      WriteLn('Pass = ', ((i - 1) div PerPass) + 1, ' of ', ((NumberOfNodes - 1) div PerPass) + 1);
      WriteLn('Chrs = ', Chrs);
      finish := TickCount;
      SearchTime := Round((finish - start - waits) / 60);
      Hours := SearchTime div 3600;
      Minutes := (SearchTime mod 3600) div 60;
      Seconds := SearchTime mod 60;
      Write('Time = ');
      if Hours > 0 then
        Write(Hours, ' hr ');
      if Minutes > 0 then
        Write(Minutes, ' min ');
      WriteLn(Seconds, ' sec ');
      Write('TERMINATE the search ?');
      SetCursor(arrow);
      ReadLn(str);
      SetCursor(GetCursor(watchCursor)^^);
      if (str[1] = 'Y') or (str[1] = 'y') then
        begin
          abort := TRUE;
          i := NumberOfNodes;
          WriteLn('Aborting...');
        end
      else
        begin
          abort := FALSE;
          WriteLn('Working...');
        end;
      Finish1 := TickCount;
      waits := waits + Finish1 - Start1;
    end; {KeyDown}
  updateEvt:
    begin
      ShowText;
    end; {updateEvt}
  otherwise
    begin
    end; {otherwise}
  end; {case} end; {while}
{*  Close(infile);*}
if not abort then
 begin
  for j := 1 to PerPass do
   if newnode[j] <> nil then
    begin
      WriteLn(outfile, 'Zoom on ', ZoomCount[j] : 4, ' ', newnode[j]^^.key);
{*    CheckPlurals(ZoomRoot[j]);*}
      ChangeOrder1to2(ZoomRoot[j]);
      lines := 0;
      InOrder(ZoomRoot[j], 2, 1, Frequency1, Frequency2, Frequency3, lines);
      WriteLn(outfile, 'Lines = ', lines);
      WriteLn('Lines = ', lines);
    end; {for j:=1 to PerPass}
 end; {if not done then}
for j := 1 to PerPass do
 begin
  Kill_tree(ZoomRoot[j]);
 end; {for j:=1 to PerPass}
WriteLn(outfile,   '-------------------------------------------------------------');
i := i + PerPass;
```

```
    if MaxRAM < StartMem - MemLeft then
      MaxRAM := StartMem - MemLeft;
  end; {while i<=NumberOfNodes}
  err := FSClose(infile2);
  if err <> noErr then
    HaltOSError('FSClose error', err, '', '');

finish := TickCount;
  SearchTime := Round((finish - start - waits) / 60);
  Hours := SearchTime div 3600;
  Minutes := (SearchTime mod 3600) div 60;
  Seconds := SearchTime mod 60;

Write(outfile, 'Time = ');
  if Hours > 0 then
    Write(outfile, Hours, ' hr ');
  if Minutes > 0 then
    Write(outfile, Minutes, ' min ');
  WriteLn(outfile, Seconds, ' sec ');
  WriteLn(outfile, 'Total Lines = ', Keys);
  WriteLn(outfile, 'Chrs = ', Chrs);
  WriteLn(outfile, 'RAM   = ', MaxRAM, ' Bytes');
  Close(outfile);

Write('Time = ');
  if Hours > 0 then
    Write(Hours, ' hr ');
  if Minutes > 0 then
    Write(Minutes, ' min ');
  WriteLn(Seconds, ' sec ');
  WriteLn('Total Lines = ', Keys);
  WriteLn('Chrs = ', Chrs);
  WriteLn('RAM   = ', MaxRAM, ' Bytes');

err := GetFInfo(OutputFileName, 0, fndrInfo);
  fndrInfo.fdCreator := MyFileCreator;
  fndrInfo.fdType := MyFileType;
  fndrInfo.fdFlags := 6;
  err := SetFInfo(OutputFileName, 0, fndrInfo);
  err := GetVol(@volName, volRefNum);
  err := FlushVol(nil, volRefNum);
  Kill_tree(root);
  Kill_tree(TrivialRoot);
  WriteLn;
  SysBeep(1);
  WriteLn('Press Return to Quit...');
  SetCursor(arrow);

done := FALSE;
  repeat
    EventReceived := WaitNextEvent(EveryEvent, theEvent, 0, nil);
    case theEvent.what of
      NullEvent:
        begin
        end; {NullEvent}
      keyDown:
        begin
          done := TRUE;
        end; {KeyDown}
      updateEvt:
        begin
          ShowText;
        end; {updateEvt}
      otherwise
        begin
{*        WriteLn('E=', theEvent.what);*}
        end; {otherwise}
```

```
    end; {case}
    until done;

HideAll;
end; {do_Zoom}

{---------------------------------------------------------------------}
 procedure do_FrequencySort (InputFileName, TrivialFileName, OutputFileName2, OutputFileName1, OutputFileNa
  str255;
          Action, Frequency1, Frequency2, Frequency3: Integer);
 begin {TextSlicer}
  SetRect(r, 5, 40, 505, 340);
  SetTextRect(r);
  ShowText;
  CouldAlert(129);
  StartMem := FreeMem;

start := TickCount;
  case Action of
   1, 4:
    NumWords := 1;
   2, 5:
    NumWords := 2;
   3, 6:
    NumWords := 3;
  end; {case}
  TrivialRoot := nil;
  LoadSearchTree(TrivialRoot, TrivialFileName);
  GetDateTime(NumSecs);
  IUDateString(NumSecs, LongDate, Date);
  IUTimeString(NumSecs, FALSE, Time);
{*    Reset(infile, InputFileName);*}
  err := GetFInfo(InputFileName, 0, fndrInfo);
  if err <> noErr then
   HaltOSError('Invalid file error', err, '', '');
  err := FSOpen(InputFileName, 0, infile2);
  if err <> noErr then
   HaltOSError('FSOpen error', err, '', '');

WriteLn('---------------------------------------------------------');
  WriteLn(version);
  WriteLn('Run : ', Date, '   ', Time);
  WriteLn('InputFileName: ', InputFileName);
  WriteLn('TrivialFileName: ', TrivialFileName);
  case NumWords of
   1:
    begin
     WriteLn('Frequency Cutoff: ', Frequency1);
     WriteLn('Word Frequencey');
    end;
   2:
    begin
     WriteLn('Frequency Cutoff: ', Frequency2);
     WriteLn('Pairs Frequencey');
    end;
   3:
    begin
     WriteLn('Frequency Cutoff: ', Frequency3);
     WriteLn('Triplet Frequencey');
    end;
  end; {case}
  root := nil;
  word1 := '';
  word2 := '';
  word3 := '';
  lines := 0;
  Keys := 0;
```

```
Chrs := 0;
waits := 0;
start := TickCount;
Start1 := TickCount;
justRead := FALSE;

TotalCount := 0;
EndOfFile := FALSE;
first := 1;
ReadBuffer(infile2, first, last, buffer, EndOfFile, Chrs);
done := FALSE;
abort := FALSE;
while not done and not abort do
  begin
    repeat
      s1 := NextWord(buffer, first, last, EndOfLine);
      UprString(s1, FALSE);
      if (s1 <> '') then
        begin
          word3 := word2;
          word2 := word1;
          word1 := s1;
          case NumWords of
            1:
              if NonTrivial1(TrivialRoot, word1) then
                AddOrIncrement(root, word1);
            2:
              if (word2 <> '') then
                if NonTrivial1(TrivialRoot, word2) and NonTrivial1(TrivialRoot, word1) then
                  AddOrIncrement(root, Concat(word2, ' ', word1));
            3:
              if (word2 <> '') and (word3 <> '') then
                if NonTrivial1(TrivialRoot, word3) and NonTrivial2(word2) and NonTrivial1(TrivialRcot, word1) th
                  AddOrIncrement(root, Concat(word3, ' ', word2, ' ', word1));
          end; {case}
        end;

if (first > TextBufferLimit) and not EndOfFile then
        begin
          s := TextBufferSize - first + 1;
          BlockMove(PTR(@buffer[first]), PTR(@buffer[1]), s);
          first := 1;
          s := s + 1;
          ReadBuffer(infile2, s, last, buffer, EndOfFile, Chrs);
          justRead := TRUE;
        end;
      if (first >= last) and EndOfFile then
        done := TRUE;
    until done or justRead;

justRead := FALSE;
{*      finish := TickCount;*}
{*      if (finish - start1 > 120) then*}
{*      begin*}
    EventReceived := WaitNextEvent(EveryEvent, theEvent, 0, nil);
    case theEvent.what of
      NullEvent:
        begin
        end; {NullEvent}
      keyDown:
        begin
          Start1 := TickCount;
          MemLeft := FreeMem;
          WriteLn('RAM = ', MemLeft);
          WriteLn('Keys = ', Keys);
          WriteLn('Chrs = ', Chrs);
          finish := TickCount;
```

```
           SearchTime := Round((finish - start - waits) / 60);
           Hours := SearchTime div 3600;
           Minutes := (SearchTime mod 3600) div 60;
           Seconds := SearchTime mod 60;
           Write('Time = ');
           if Hours > 0 then
             Write(Hours, ' hr ');
           if Minutes > 0 then
             Write(Minutes, ' min ');
           WriteLn(Seconds, ' sec ');
           Write('TERMINATE the search ?');
           SetCursor(arrow);
           ReadLn(str);
           SetCursor(GetCursor(watchCursor)^^);
           if (str[1] = 'Y') or (str[1] = 'y') then
             begin
               abort := TRUE;
               WriteLn('Aborting...');
             end
           else
             begin
               abort := FALSE;
               WriteLn('Working...');
             end;
           Finish1 := TickCount;
           waits := waits + Finish1 - Start1;
         end; {KeyDown}
         updateEvt:
           begin
             ShowText;
           end; {updateEvt}
         otherwise
           begin
{*          WriteLn('E=', theEvent.what);*}
           end; {otherwise}
         end; {case}
{*       Start1 := TickCount;*}
{*       end;*}
       end; {while not done}
{*     Close(infile);*}
     err := FSClose(infile2);
     if err <> noErr then
       HaltOSError('FSClose error', err, '', '');

finish := TickCount;
     SearchTime := Round((finish - start - waits) / 60);
     Hours := SearchTime div 3600;
     Minutes := (SearchTime mod 3600) div 60;
     Seconds := SearchTime mod 60;

if not abort then
       begin
{*       CheckPlurals(root);*}
         if OutputFileName1 <> '' then
           begin
             WriteLn('OutputFileName1: ', OutputFileName1);
             WriteLn('Sorted Alpabetically by First Word');
             WriteLn;
             Rewrite(outfile, OutputFileName1);
             WriteLn(outfile, version);
             WriteLn(outfile, 'Run : ', Date, '    ', Time);
             WriteLn(outfile, 'InputFileName: ', InputFileName);
             WriteLn(outfile, 'TrivialFileName: ', TrivialFileName);
             WriteLn(outfile, 'OutputFileName1: ', OutputFileName1);
             WriteLn(outfile, 'Sorted Alpabetically by First Word');
             case NumWords of
               1:
```

```
      begin
        WriteLn(outfile, 'Frequency Cutoff: ', Frequency1);
        WriteLn(outfile, 'Word Frequencey');
      end;
    2:
      begin
        WriteLn(outfile, 'Frequency Cutoff: ', Frequency2);
        WriteLn(outfile, 'Pairs Frequencey');
      end;
    3:
      begin
        WriteLn(outfile, 'Frequency Cutoff: ', Frequency3);
        WriteLn(outfile, 'Triplet Frequencey');
      end;
  end; {case}
  WriteLn(outfile);
  Write(outfile, 'Time = ');
  if Hours > 0 then
    Write(outfile, Hours, ' hr ');
  if Minutes > 0 then
    Write(outfile, Minutes, ' min ');
  WriteLn(outfile, Seconds, ' sec ');
  WriteLn(outfile, 'Total Lines = ', Keys);
  WriteLn(outfile, 'Chrs    = ', Chrs);
  WriteLn(outfile, 'RAM    = ', StartMem - MemLeft, ' Bytes');
  WriteLn(outfile,    '-----------------------------------------------------------');

lines := 0;
  InOrder(root, 1, 1, Frequency1, Frequency2, Frequency3, lines);
  WriteLn(outfile, 'Lines = ', lines);
  WriteLn('Lines = ', lines);
  Close(outfile);
  err := GetFInfo(OutputFileName1, 0, fndrInfo);
  fndrInfo.fdCreator := MyFileCreator;
  fndrInfo.fdType := MyFileType;
  fndrInfo.fdFlags := 6;
  err := SetFInfo(OutputFileName1, 0, fndrInfo);
  err := GetVol(@volName, volRefNum);
  err := FlushVol(nil, volRefNum);
end; {OutputFileName1} if OutputFileName2 <> '' then
 begin
  ChangeOrder1to2(root);
  WriteLn('OutputFileName2: ', OutputFileName2);
  WriteLn('Sorted by Frequencey');
  WriteLn;
  Rewrite(outfile, OutputFileName2);
  WriteLn(outfile, version);
  WriteLn(outfile, 'Run : ', Date, '    ', Time);
  WriteLn(outfile, 'InputFileName: ', InputFileName);
  WriteLn(outfile, 'TrivialFileName: ', TrivialFileName);
  WriteLn(outfile, 'OutputFileName2: ', OutputFileName2);
  WriteLn(outfile, 'Sorted by Frequencey');
  case NumWords of
    1:
      begin
        WriteLn(outfile, 'Frequency Cutoff: ', Frequency1);
        WriteLn(outfile, 'Word Frequencey');
      end;
    2:
      begin
        WriteLn(outfile, 'Frequency Cutoff: ', Frequency2);
        WriteLn(outfile, 'Pairs Frequencey');
      end;
    3:
      begin
```

```
        WriteLn(outfile, 'Frequency Cutoff: ', Frequency3);
        WriteLn(outfile, 'Triplet Frequencey');
      end;
    end; {case}
  WriteLn(outfile);
  Write(outfile, 'Time = ');
  if Hours > 0 then
    Write(outfile, Hours, ' hr ');
  if Minutes > 0 then
    Write(outfile, Minutes, ' min ');
  WriteLn(outfile, Seconds, ' sec ');
  WriteLn(outfile, 'Total Lines = ', Keys);
  WriteLn(outfile, 'Chrs = ', Chrs);
  WriteLn(outfile, 'RAM  = ', StartMem - MemLeft, ' Bytes');
  WriteLn(outfile,      '-------------------------------------------------------');
  lines := 0;
  InOrder(root, 2, 1, Frequency1, Frequency2, Frequency3, lines);
  WriteLn(outfile, 'Lines = ', lines);
  WriteLn('Lines = ', lines);
  Close(outfile);
  err := GetFInfo(OutputFileName2, 0, fndrInfo);
  fndrInfo.fdCreator := MyFileCreator;
  fndrInfo.fdType := MyFileType;
  fndrInfo.fdFlags := 6;
  err := SetFInfo(OutputFileName2, 0, fndrInfo);
  err := GetVol(@volName, volRefNum);
  err := FlushVol(nil, volRefNum);
 end; {OutputFileName2} if OutputFileName3 <> '' then
 begin
  ChangeOrder2to3(root);
  WriteLn('OutputFileName3: ', OutputFileName3);
  WriteLn('Sorted Alpabetically by Last Word');
  WriteLn;
  Rewrite(outfile, OutputFileName3);
  WriteLn(outfile, version);
  WriteLn(outfile, 'Run : ', Date, '    ', Time);
  WriteLn(outfile, 'InputFileName: ', InputFileName);
  WriteLn(outfile, 'TrivialFileName: ', TrivialFileName);
  WriteLn(outfile, 'OutputFileName3: ', OutputFileName3);
  WriteLn(outfile, 'Sorted Alpabetically by Last Word');
  case NumWords of
    1:
      begin
        WriteLn(outfile, 'Frequency Cutoff: ', Frequency1);
        WriteLn(outfile, 'Word Frequencey');
      end;
    2:
      begin
        WriteLn(outfile, 'Frequency Cutoff: ', Frequency2);
        WriteLn(outfile, 'Pairs Frequencey');
      end;
    3:
      begin
        WriteLn(outfile, 'Frequency Cutoff: ', Frequency3);
        WriteLn(outfile, 'Triplet Frequencey');
      end;
    end; {case}
  WriteLn(outfile);
  Write(outfile, 'Time = ');
  if Hours > 0 then
    Write(outfile, Hours, ' hr ');
  if Minutes > 0 then
    Write(outfile, Minutes, ' min ');
  WriteLn(outfile, Seconds, ' sec ');
  WriteLn(outfile, 'Total Lines = ', Keys);
```

```
        WriteLn(outfile, 'Chrs = ', Chrs);
        WriteLn(outfile, 'RAM  = ', StartMem - MemLeft, ' Bytes');
        WriteLn(outfile, '--------------------------------------------------------');
        lines := 0;
        InOrder(root, 3, 1, Frequency1, Frequency2, Frequency3, lines);
        WriteLn(outfile, 'Lines = ', lines);
        WriteLn('Lines = ', lines);
        Close(outfile);
        err := GetFInfo(OutputFileName3, 0, fndrInfo);
        fndrInfo.fdCreator := MyFileCreator;
        fndrInfo.fdType := MyFileType;
        fndrInfo.fdFlags := 6;
        err := SetFInfo(OutputFileName3, 0, fndrInfo);
        err := GetVol(@volName, volRefNum);
        err := FlushVol(nil, volRefNum);
      end; {OutputFileName3}

Write('Time = ');
    if Hours > 0 then
      Write(Hours, ' hr ');
    if Minutes > 0 then
      Write(Minutes, ' min ');
    WriteLn(Seconds, ' sec ');
    WriteLn('Total Lines = ', Keys);
    WriteLn('Chrs = ', Chrs);
    WriteLn('RAM  = ', StartMem - MemLeft, ' Bytes');
  end; {outputs}

Kill_tree(root);
  Kill_tree(TrivialRoot);

if (Action <= 3) then
    begin
      WriteLn;
      SysBeep(1);
      WriteLn('Press Return to Quit...');
      SetCursor(arrow);
      done := FALSE;
      repeat
        EventReceived := WaitNextEvent(EveryEvent, theEvent, 0, nil);
        case theEvent.what of
          NullEvent:
            begin
            end; {NullEvent}
          keyDown:
            begin
              done := TRUE;
            end; {KeyDown}
          updateEvt:
            begin
              ShowText;
            end; {updateEvt}
          otherwise
            begin
{*            WriteLn('E=', theEvent.what);*}
            end; {otherwise}
        end; {case}
      until done;
    end; {Action<=3}

HideAll;
end; {do_FrequencySort}

{--------------------------------------------------------------------}
end.
unit Text1;
interface
```

```
uses
  Tree;

{------------------------------------------------------------------------}
  procedure AddInclusion (InputFileName, Input1FileName, Input2FileName, Input3FileName, OutputFileName: str2
        EquivalenceIndex, InclusionIndex: Real);

{------------------------------------------------------------------------}
implementation
{------------------------------------------------------------------------}
  procedure AddInclusion;
  var
    NumWords: Integer;
    StartMem, MemLeft: LongInt;
    Start, Finish, SearchTime, Hours, Minutes, Seconds: LongInt;
    Start1, Finish1, waits: LongInt;
    theEvent: EventRecord;
    s1, str: str255;
    done, shorter, taller: Boolean;
    infile, outfile: TEXT;
    root, TrivialRoot: nodeHndl;
    Keys, Chrs: LongInt;
    Count: Integer;
    word1, word2, word3: word_type;
    i, j: Integer;
    Words: Word_list;
    WordsTag: TagWord_list;
    TaggedWords: TagWordHndl;
    CoWords: CoWordHndl;
    newnode: nodeHndl;
    NumberOfNodes: Integer;
    EmptyShifts: Integer;
    Space: LongInt;
    MaxRAM: LongInt;
    lines: LongInt;
    tagCount: LongInt;
    countID: LongInt;
    EventReceived: Boolean;

infile2: integer;
    TotalCount: LongInt;
    EndOfLine, EndOfFile: Boolean;
    buffer: textBuffer;
    first, last, s: Integer;

r: Rect;
    err, err1: OSErr;
    fndrInfo: FInfo;
    volRefNum: Integer;
    volName: Str255;

{*  DecTemp, TimeStr: DecStr;*}
{*  f: DecForm;*}
    myDateForm: DateForm;
    NumSecs: LongInt;
    Date, Time: str255;

Frequency: array[1..3] of LongInt;
    Ci, Cj, Cij: LongInt;
    IncIndex, EquIndex: Real;
    LongIntNum: LongInt;
    nextfile: Boolean;
    s2, str1: str255;

{------------------------------------------------------------------------}
  procedure AddNode (var root: nodeHndl;
          str: key_type);
```

```
var
  taller: Boolean;
  newnode: nodeHndl;
  st1, st2: str255;
  Size: Integer;
  err: OSErr;
begin
  FindNode(root, newnode, str);
  if newnode = nil then
{• newnode^^.count := newnode^^.count + 1•}
{• else•}
    begin
      Size := EmptySize + (length(str) + 2) div 2 * 2;
      newnode := nodeHndl(NewHandle(Size));
      err := MemError;
      MemLeft := FreeMem;
      if (err <> noErr) or (MemLeft < 4096) then
        begin
          NumToString(Keys, st1);
          NumToString(Chrs, st2);
          st1 := Concat('Keys = ', st1);
          st2 := Concat('Chrs = ', st2);
          HaltOSError('Out Of Memory', err, st1, st2);
        end;
      Keys := Keys + 1;
      newnode^^.count := 0;
      newnode^^.key := str;
      InsertNode(root, newnode, 1, taller);
    end;
end; {AddNode}

{------------------------------------------------------------------------}
begin
  SetRect(r, 5, 40, 505, 340);
  SetTextRect(r);
  ShowText;
  CouldAlert(129);
{• MemLeft := SIZEOF(nodeRecord);•}
{• WriteLn(StackSpace, ' ', FreeMem);•}
{• ReadLn;•}
  StartMem := FreeMem;

MaxRAM := 0;
  waits := 0;
  start := TickCount;
  root := nil;
  GetDateTime(NumSecs);
  IUDateString(NumSecs, LongDate, Date);
  IUTimeString(NumSecs, FALSE, Time);
  WriteLn('------------------------------------------------------------');
  WriteLn(version);
  WriteLn('Run : ', Date, '   ', Time);
  WriteLn('Zoom Input File: ', InputFileName);
  WriteLn('Word Frequency File: ', Input1FileName);
  WriteLn('Pairs Frequency File: ', Input2FileName);
  WriteLn('Triplet Frequency File: ', Input3FileName);
  WriteLn('Output File: ', OutputFileName);
  WriteLn('Inclusion Index');
  WriteLn;

Keys := 0;
  Chrs := 0;
  done := FALSE;
  WriteLn('Reading Zoom Input File...');
  Reset(infile, InputFileName);
  while not Eof(infile) and not done do
    begin
```

```
      ReadLn(infile, str);
      Chrs := Chrs + Length(str) + 1;
      s1 := next(str);
{*    s1 := NextWord(str);*}
      if (ord(s1[1]) >= 48) and (ord(s1[1]) <= 57) then
        begin
          AddNode(root, str);
        end {if number}
      else
        begin
          if (s1 = 'Frequency') then
            begin
              s1 := next(str);
{*            s1 := NextWord(str);*}
              for j := 1 to 3 do
                begin
                  s1 := next(str);
{*                s1 := NextWord(str);*}
                  StringToNum(s1, Frequency[j]);
                end;
            end;
        end; {if number}
      EventReceived := WaitNextEvent(EveryEvent, theEvent, 0, nil);
      case theEvent.what of
        keyDown:
          begin
            Start1 := TickCount;
            MemLeft := FreeMem;
            WriteLn('RAM  = ', MemLeft);
            WriteLn('Keys = ', Keys);
            WriteLn('Chrs = ', Chrs);
            finish := TickCount;
            SearchTime := Round((finish - start - waits) / 60);
            Hours := SearchTime div 3600;
            Minutes := (SearchTime mod 3600) div 60;
            Seconds := SearchTime mod 60;
            Write('Time = ');
            if Hours > 0 then
              Write(Hours, ' hr ');
            if Minutes > 0 then
              Write(Minutes, ' min ');
            WriteLn(Seconds, ' sec ');
            Write('TERMINATE the search ?');
            SetCursor(arrow);
            ReadLn(str);
            SetCursor(GetCursor(watchCursor)^^);
            If (str[1] = 'Y') or (str[1] = 'y') then
              begin
                done := TRUE;
                WriteLn('Aborting...');
              end
            else
              begin
                done := FALSE;
                WriteLn('Working...');
              end;
            Finish1 := TickCount;
            waits := waits + Finish1 - Start1;
          end; {KeyDown}
        updateEvt:
          begin
            ShowText;
          end; {updateEvt}
      end; {case}
    end; {while not eof}
    Close(infile);
    if MaxRAM < StartMem - MemLeft then
```

```
      MaxRAM := StartMem - MemLeft;

j := 1;
while j <= 3 do
  begin
    case j of
      1:
        begin
          WriteLn('Reading Word Frequency File...');
          Reset(infile, Input1FileName);
        end;{1}
      2:
        begin
          WriteLn('Reading Pairs Frequency File...');
          Reset(infile, Input2FileName);
        end;{1}
      3:
        begin
          WriteLn('Reading Triplet Frequency File...');
          Reset(infile, Input3FileName);
        end;{1}
    end; {case}
    nextfile := FALSE;
    while not Eof(infile) and not done and not nextfile do
      begin
        ReadLn(infile, str);
{*      Chrs := Chrs + Length(str) + 1;*}
        s1 := next(str);
{*      s1 := NextWord(str);*}
        if (ord(s1[1]) >= 48) and (ord(s1[1]) <= 57) then
          begin
            StringToNum(s1, LongIntNum);
            if (Frequency[j] > LongIntNum) then
              nextfile := TRUE
            else
              begin
                FindNode(root, newnode, str);
                if newnode <> nil then
                  newnode^^.count := LongIntNum;
              end; {if number>Freq}
          end; {if number}
        EventReceived := WaitNextEvent(EveryEvent, theEvent, 0, nil);
        case theEvent.what of
          keyDown:
            begin
              Start1 := TickCount;
              MemLeft := FreeMem;
              WriteLn('RAM  = ', MemLeft);
{*            WriteLn('Keys = ', Keys);*}
{*            WriteLn('Chrs = ', Chrs);*}
              finish := TickCount;
              SearchTime := Round((finish - start - waits) / 60);
              Hours := SearchTime div 3600;
              Minutes := (SearchTime mod 3600) div 60;
              Seconds := SearchTime mod 60;
              Write('Time = ');
              if Hours > 0 then
                Write(Hours, ' hr ');
              if Minutes > 0 then
                Write(Minutes, ' min ');
              WriteLn(Seconds, ' sec ');
              Write('TERMINATE the search ?');
              SetCursor(arrow);
              ReadLn(str);
              SetCursor(GetCursor(watchCursor)^^);
              if (str[1] = 'Y') or (str[1] = 'y') then
                begin
```

```
                done := TRUE;
                j := 3;
                WriteLn('Aborting...');
              end
            else
              begin
                done := FALSE;
                WriteLn('Working...');
              end;
              Finish1 := TickCount;
              waits := waits + Finish1 - Start1;
            end; {KeyDown}
          updateEvt:
            begin
              ShowText;
            end; {updateEvt}
          end; {case theEvent.what of}
        end; {while not eof}
      Close(infile);
      j := j + 1;
      if MaxRAM < StartMem - MemLeft then
        MaxRAM := StartMem - MemLeft;
    end;{while j<=3 do}

WriteLn('Writing Inclusion Output File...');
  Rewrite(outfile, OutputFileName);
  WriteLn(outfile, version);
  WriteLn(outfile, 'Run : ', Date, '  ', Time);
  WriteLn(outfile, 'Zoom Input File: ', InputFileName);
  WriteLn(outfile, 'Word Frequency File: ', Input1FileName);
  WriteLn(outfile, 'Pairs Frequency File: ', Input2FileName);
  WriteLn(outfile, 'Triplet Frequency File: ', Input3FileName);
  WriteLn(outfile, 'Output File: ', OutputFileName);
  WriteLn(outfile, 'Frequency Cutoff: ', Frequency[1], Frequency[2], Frequency[3]);
  WriteLn(outfile, 'Inclusion Index');
  WriteLn(outfile, '    Sample');
  WriteLn(outfile, 'Zoom on Ci ACOUSTIC');
  WriteLn(outfile, ' Cij     Cj     Cij/Cj  (Cij)^2/(Ci*Cj)  RESEARCH');
  WriteLn(outfile);
  WriteLn(outfile,    '-------------------------------------------------------');
{* Keys := 0;*}
{* Chrs := 0;*}
  Reset(infile, InputFileName);
  Ci := 0;
  Cj := 0;
  Cij := 0;
  while not Eof(infile) and not done do
    begin
      ReadLn(infile, str);
      str1 := str;
      Chrs := Chrs + Length(str) + 1;
      s1 := next(str);
{*    s1 := NextWord(str);*}
      if (ord(s1[1]) >= 48) and (ord(s1[1]) <= 57) then
        begin
          StringToNum(s1, Cij);
          FindNode(root, newnode, str);
          if newnode <> nil then
            Cj := newnode^.count;
          IncIndex := Cij / Cj;
          EquIndex := Sqr(Cij) / (Ci * Cj);
          if (EquIndex >= EquivalenceIndex) or (IncIndex >= InclusionIndex) then
            WriteLn(outfile, Cij : 4, TabChar, Cj : 5, TabChar, IncIndex : 7 : 3, TabChar, EquIndex : 7 : 4, TabChar,
        end {if number}
      else
        begin
          s2 := next(str);
```

```
{•    s1 := NextWord(str);•}
      if (s1 = 'Zoom') and (s2 = 'on') then
        begin
          s1 := next(str);
{•    s1 := NextWord(str);•}
          StringToNum(s1, Ci);
          WriteLn(outfile, str1);
        end
      else
        WriteLn(outfile, str1);
    end; {else not number}
  EventReceived := WaitNextEvent(EveryEvent, theEvent, 0, nil);
  case theEvent.what of
    keyDown:
      begin
        Start1 := TickCount;
        MemLeft := FreeMem;
        WriteLn('RAM   = ', MemLeft);
{•      WriteLn('Keys = ', Keys);•}
{•      WriteLn('Chrs = ', Chrs);•}
        finish := TickCount;
        SearchTime := Round((finish - start - waits) / 60);
        Hours := SearchTime div 3600;
        Minutes := (SearchTime mod 3600) div 60;
        Seconds := SearchTime mod 60;
        Write('Time = ');
        if Hours > 0 then
          Write(Hours, ' hr ');
        if Minutes > 0 then
          Write(Minutes, ' min ');
        WriteLn(Seconds, ' sec ');
        Write('TERMINATE the search ?');
        SetCursor(arrow);
        ReadLn(str);
        SetCursor(GetCursor(watchCursor)^^);
        if (str[1] = 'Y') or (str[1] = 'y') then
          begin
            done := TRUE;
            WriteLn('Aborting...');
          end
        else
          begin
            done := FALSE;
            WriteLn('Working...');
          end;
        Finish1 := TickCount;
        waits := waits + Finish1 - Start1;
      end; {KeyDown}
    updateEvt:
      begin
        ShowText;
      end; {updateEvt}
    end; {case}
  end; {while not eof}
Close(infile);

if MaxRAM < StartMem - MemLeft then
  MaxRAM := StartMem - MemLeft;
finish := TickCount;
SearchTime := Round((finish - start - waits) / 60);
Hours := SearchTime div 3600;
Minutes := (SearchTime mod 3600) div 60;
Seconds := SearchTime mod 60;

WriteLn(outfile);
WriteLn(outfile,    '------------------------------------------------------------');
```

```
Write(outfile, 'Time = ');
if Hours > 0 then
  Write(outfile, Hours, ' hr ');
if Minutes > 0 then
  Write(outfile, Minutes, ' min ');
WriteLn(outfile, Seconds, ' sec ');
WriteLn(outfile, 'Total Lines = ', Keys);
WriteLn(outfile, 'Chrs = ', Chrs);
WriteLn(outfile, 'RAM  = ', MaxRAM, ' Bytes');
Close(outfile);

Write('Time = ');
if Hours > 0 then
  Write(Hours, ' hr ');
if Minutes > 0 then
  Write(Minutes, ' min ');
WriteLn(Seconds, ' sec ');
WriteLn('Total Lines = ', Keys);
WriteLn('Chrs = ', Chrs);
WriteLn('RAM  = ', MaxRAM, ' Bytes');

err := GetVol(@volName, volRefNum);
err := FlushVol(nil, volRefNum);
err := GetFInfo(OutputFileName, 0, fndrInfo);
fndrInfo.fdCreator := MyFileCreator;
fndrInfo.fdType := MyFileType;
fndrInfo.fdFlags := 6;
err := SetFInfo(OutputFileName, 0, fndrInfo);
err := GetVol(@volName, volRefNum);
err := FlushVol(nil, volRefNum);

Kill_tree(root);
WriteLn;
SysBeep(1);
WriteLn('Press Return to Quit...');
SetCursor(arrow);

done := FALSE;
repeat
  EventReceived := WaitNextEvent(EveryEvent, theEvent, 0, nil);
  case theEvent.what of
    NullEvent:
      begin
      end; {NullEvent}
    keyDown: -
      begin
        done := TRUE;
      end; {KeyDown}
    updateEvt:
      begin
        ShowText;
      end; {updateEvt}
```

What we now claim for our invention is:

1. A system for full-text database searching, for identification of often repeated phrases which by virtue of their repeated occurrence, frequency of occurrence above a user-set threshold, or user input constitute phrases having a high user-interest designated as pervasive them areas (PTAs), said phrases consisting of one to n words (n*words), where n is an integer, in one or more documents defined as the database, relationships defined as connectivity among said PTAs, and phrases in close physical proximity to and which are supportive of said PTAs, comprising:

means for introducing document information content into a full-text database in digital form;

means for digitally storing said database;

means for processing said digitally stored database;

means operatively associated with said processing means and said storing means for identifying pervasive theme areas (PTAs) defined as often-repeating word phrases consisting of one or more adjacent words such that said phrases are one word phrases, adjacent 2 word phrases, adjacent 3 word phrases . . . and adjacent n* word phrases, and for entering said phrases in said storing means;

means for identifying phrases in said database related to said PTAs, said phrases being defined as m words, where m=1,2,3, . . . n and where each word phrase for m=2,3, . . . n is composed of adjacent words, said word phrase for m=1 being a single word phrase, for m=2 a double word phrase, for m=3 a triple word phrase ... and for n=m an nth word phrase, by applying a user specified range of interest R expressed as a number of single words appearing both before and after said PTAs, and for storing said identified phrases in said storing means;

means for counting for each PTA the extracted phrases within said range of said PTA stored in said storage means, sorting all phases found for each PTA by frequency of occurrence, listing each PTA and its related sorted list of extracted phrases, and storing said counts and said lists of PTA's and their related sorted list of extracted phrases in said storing means;

means for quantifying the strength of relationship between extracted phrases and each pervasive theme area (PTA) applying user-predefined numerical indices and figures of merit, and providing the results of said quantifying means to said storing means;

means for obtaining the results of said quantification from said quantifying means and said storing means and presenting said results to said user for user-selection of phrases having a relationship to each PTA predicated on the relationship strengths obtained by said quantifying means;

means for identifying PTAs which are closely related, said means employing user-input figure of merit threshold values above a user-predetermined number for selecting phrases of high-user interest, said means storing identified closely related PTAs in said storing means;

means for identifying phrases in common among PTA and storing those identified in said storing means;

means for identifying and grouping related PTA based upon the number of phrases in common among the PTA, said number being above a user-input predetermined threshold, each group having at least one PTA having extracted phrases in common with one or more other PTA in said group, said groupings of PTA's stored in said storing means; and means for displaying relationships among related PTA and between PTA and related phrases said display means connected to said processing means.

2. The system of claim 1 wherein said means for identifying pervasive theme areas in said database, comprises:
a means for counting frequency of occurrence of said n* word phrases;
a means for creating a list of all n* word phrases and the frequency of occurrence for each of said n* word phrases;
a means for sorting said list of n* word phrases by frequency of occurrence:
a means for defining pervasive theme areas from said list of sorted phrases; and
a means for selecting the number of said n* word phrases to be used as pervasive theme areas.

3. The system of claim 2 wherein said means for identifying phrases in said database related to said pervasive theme areas (PTAs), comprises:
a means for extracting phrases for each PTA from the full-text database which occur within a set range of single words of the PTA; and,
a means for listing the extracted phrases for each PTA and their frequency of occurrence in the database.

4. The system of claim 3 wherein said means for quantifying the strength of relationship between said phrases and each pervasive theme area, comprises:
a means for producing numerical indices and figures of merit from said database; and
a means for applying said numerical indices and figures of merit to quantify the strength of relationship of each said phrase and each pervasive theme area.

5. The system of claim 4 wherein said means for producing numerical indices and figures of merit employs definitions for numerical indices selected from the group consisting of absolute frequency of occurrence, denominated $C_j$, of the pervasive theme area, absolute frequency of occurrence of the extracted phrases $C_i$ for single, adjacent double, adjacent triple ... adjacent nth, and $C_{ij}$ the frequency of occurrence of the extracted phrases (single, adjacent double, adjacent triple, ... adjacent mth) within a set range of single words of the pervasive theme area.

6. The system of claim 5 wherein said means for producing numerical indices and figures of merit employs definitions for figure of merit selected from the group consisting of the ratios of the frequencies of occurrence $C_{ij}/C_i$, $C_{ij}/C_j$, and $(C_{ij}^2)/(C_i*C_j)$.

7. The system of claim 6 wherein said means for identifying pervasive theme areas (PTAs) which are closely related comprises:
a means for defining threshold values of the figures of merit for selecting single, adjacent double, adjacent triple, ... adjacent mth word phrases of high user interest;
a means for selecting phrases of high interest having figures of merit above said threshold, said selection being made from the list of extracted phrases;
a means for computing commonality defined as the degree of similarity or close relatedness of extracted phrases between different pervasive theme areas; and
a means for generating groups of PTAs, each PTA in a group having extracted phrases in common with at least one other PTA in the group.

8. The system of claim 1 wherein said means for identifying pervasive theme areas in said database comprises a means for creating a list of all phrases and for each phrase indicating its order in said list in accordance with a user prespecified sort criteria;
a means for sorting said phrases in accordance with said user pre-specified sort criteria;
a means for defining pervasive theme areas from said phrases;
a means for selecting a number of said phrases to be used as pervasive them areas.

9. The system of claim 8 wherein said sort criteria is alphabetical by consecutive word order in said phrase.

10. The computer implemented method of full-text database searching, comprising the steps of:
a. assembling information into a full-text database by scanning documents and storing digitized results in said computer;
b. eliminating trivial phrases from said databases by comparing a user-input list of such phrases with the entire contents of said database and deleting matches with said list;
c. using the definition of phrase as m*word=phrase where m=1,2,3, ... n and where each word phrase for m=2,3 ... n is composed of adjacent words, said word phrase for m=1 being a single word phrase, for m=2 an adjacent double word phrase, and for m=3 an adjacent triple word phrase, ... and for m=n an adjacent nth word phrase, creating a list of all single word phrases, a list of all adjacent double word phrases, a list of all adjacent triple word phrases, ..., and a list of all adjacent nth word phrases and their frequencies of occurrence in the database;

d. sorting each list of said phrases by their frequency of occurrence in said list;

e. identifying pervasive theme areas in the information in said database;

f. defining pervasive theme areas from said sorted list of phrases as the most frequently occurring phrases of high user-interest.

g. identifying phrases in said database that are related to said pervasive theme areas;

h. quantifying strength of relationships between said identified phrases and said pervasive theme areas;

i. identifying pervasive theme areas which are closely related;

j. displaying relationships among related pervasive theme areas and pervasive theme areas and related phrases; wherein the step of identifying phrases related to pervasive theme area further comprises the steps of k. extracting phrases for each pervasive theme area (PTA) from the full-text database which occur within a user-identified range of interest plus or minus a range of words of the PTA; and l. listing the extracted phrases and their frequency of occurrence in the database for each PTA.

11. The method of claim 10 wherein the step of quantifying the strength of relationship between phrases and each pervasive theme area (PTA) further comprises the steps of:

a. preparing numerical indices and figures of merit for quantifying strength of relationship between extracted phrases and their PTA; and b. applying said numerical indices and figures of merit to said phrases relative to their respective PTA.

12. The method of claim 11 wherein the step of identifying pervasive theme areas (PTA) which are closely related further comprises the steps of:

a. defining threshold values above some predetermined number for the figures of merit for selecting phrases;

b. selecting, from the list of extracted phrases for each PTA, phrases of high user interest having figures of merit above the threshold;

c. computing commonality of extracted phrases among the different phrases in terms of the numbers of phrases in common among PTA, or equivalent; and, d. generating groups of PTA such that each PTA in a given group has extracted phrases in common with at least one other PTA in the group.

13. The method of claim 12 wherein said step of identifying pervasive theme area further comprises the steps:

creating a list of all phrases sorted and ordered in accordance with frequency of occurence of said phrases;

sorting said ordered phrases in accordance with a user pre-specified user-interest criteria;

defining pervasive theme areas from said user interest phrases; and selecting the number of said phrases to be used as pervasive theme areas.

14. The system of claim 13 wherein said sort criteria is alphabetical by consecutive word order in said phrase.

* * * * *